United States Patent
Kodera

(10) Patent No.: US 10,981,598 B2
(45) Date of Patent: Apr. 20, 2021

(54) VEHICLE CONTROL APPARATUS CONTROLLING MOTOR FOR STEERING BASED ON STEERING CONDITION

(71) Applicant: JTEKT CORPORATION, Osaka (JP)

(72) Inventor: Takashi Kodera, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 182 days.

(21) Appl. No.: 16/136,462

(22) Filed: Sep. 20, 2018

(65) Prior Publication Data

US 2019/0092383 A1   Mar. 28, 2019

(30) Foreign Application Priority Data

Sep. 27, 2017  (JP) .............................. JP2017-186606

(51) Int. Cl.
*B62D 6/00* (2006.01)
*B62D 5/04* (2006.01)

(52) U.S. Cl.
CPC ........... *B62D 6/008* (2013.01); *B62D 5/0463* (2013.01); *B62D 6/002* (2013.01)

(58) Field of Classification Search
CPC . B60W 10/20; B60W 30/10–12; B62D 6/008; B62D 6/002; B62D 5/0463; B62D 5/00; B62D 6/00; B62D 15/00; B62D 6/10
USPC .................................................... 701/41–44
See application file for complete search history.

(56) References Cited

U.S. PATENT DOCUMENTS

| | | | |
|---|---|---|---|
| 2005/0017664 A1* | 1/2005 | Takahashi | B62D 6/008 318/432 |
| 2006/0037806 A1* | 2/2006 | Kasahara | B62D 6/008 180/402 |
| 2006/0086560 A1* | 4/2006 | Furusho | B62D 6/003 180/446 |

(Continued)

FOREIGN PATENT DOCUMENTS

| | | |
|---|---|---|
| DE | 198 21 024 A1 | 11/1998 |
| EP | 1 652 753 A1 | 5/2006 |

(Continued)

OTHER PUBLICATIONS

Feb. 20, 2019 Extended Search Report issued in European Patent Application No. 18196798.5.

*Primary Examiner* — Jeffrey C Boomer
*Assistant Examiner* — Paul Allen
(74) *Attorney, Agent, or Firm* — Oliff PLC

(57) ABSTRACT

A control apparatus calculates an axial force deviation, which is a difference between an ideal axial force and an estimated axial force. The ideal axial force is based on a target pinion angle of a pinion shaft configured to rotate in association with a turning operation of steered wheels. The estimated axial force is based on a state variable (such as a current value of a steering operation motor) that reflects vehicle behavior or a road condition. The control apparatus changes a command value for a reaction motor in response to the axial force deviation. For example, the control apparatus includes a basic control circuit configured to calculate a basic control amount, which is a fundamental component of the command value. The basic control circuit changes the basic control amount in response to the axial force deviation. The command value based on the basic control amount reflects the road condition.

9 Claims, 13 Drawing Sheets

(56) References Cited

U.S. PATENT DOCUMENTS

| | | | |
|---|---|---|---|
| 2011/0259663 A1* | 10/2011 | Goutsu | B62D 6/008 |
| | | | 180/402 |
| 2012/0197493 A1* | 8/2012 | Fujimoto | B62D 5/0463 |
| | | | 701/41 |
| 2014/0303850 A1* | 10/2014 | Chai | B62D 6/008 |
| | | | 701/42 |
| 2014/0316658 A1* | 10/2014 | Chai | B62D 6/008 |
| | | | 701/42 |
| 2014/0343794 A1* | 11/2014 | Tamaizumi | B62D 5/0472 |
| | | | 701/42 |
| 2015/0057890 A1* | 2/2015 | Tamaizumi | B62D 6/008 |
| | | | 701/41 |
| 2016/0229446 A1* | 8/2016 | Tamaizumi | B62D 5/0463 |
| 2017/0297613 A1* | 10/2017 | Sakaguchi | B62D 6/08 |
| 2018/0086341 A1* | 3/2018 | Taniguchi | B62D 6/008 |

FOREIGN PATENT DOCUMENTS

| | | |
|---|---|---|
| EP | 2 944 545 A1 | 11/2015 |
| GB | 2 259 892 A | 3/1993 |
| JP | 2014-148299 A | 8/2014 |

\* cited by examiner

VEHICLE CONTROL APPARATUS CONTROLLING MOTOR FOR STEERING BASED ON STEERING CONDITION

INCORPORATION BY REFERENCE

The disclosure of Japanese Patent Application No. 2017-186606 filed on Sep. 27, 2017 including the specification, drawings and abstract, is incorporated herein by reference in its entirety.

BACKGROUND OF THE INVENTION

1. Field of the Invention

The present invention relates to a vehicle control apparatus.

2. Description of the Related Art

Hitherto, there is known a so-called steer-by-wire type steering system in which a steering wheel and steered wheels are mechanically separated from each other. This steering system includes a reaction motor and a steering operation motor. The reaction motor is a source of a steering reaction force to be applied to a steering shaft. The steering operation motor is a source of a steering operation force for turning the steered wheels. When a vehicle is traveling, a control apparatus of the steering system generates the steering reaction force through the reaction motor, and turns the steered wheels through the steering operation motor.

In the steer-by-wire type steering system, it is not likely that a road reaction force applied to the steered wheels is transmitted to the steering wheel because the steering wheel and the steered wheels are mechanically separated from each other. Thus, it is difficult for the driver to grasp a road condition as the steering reaction force (tactile feedback) that may be felt by the hands through the steering wheel.

For example, a control apparatus described in Japanese Patent Application Publication No. 2014-148299 (JP 2014-148299 A) calculates a feedforward axial force and a feedback axial force. The feedforward axial force is an ideal rack axial force based on a steering angle. The feedback axial force is an estimated axial force based on state variables of the vehicle (lateral acceleration, steering operation current, and yaw rate), The feedback axial force is calculated based on a blended axial force obtained by summing up, at predetermined blending ratios, axial forces calculated individually for the state variables of the vehicle. The control apparatus calculates a final axial force by summing up the feedforward axial force and the feedback axial force at predetermined blending ratios, and controls the reaction motor based on the final axial force. The feedback axial force reflects a road condition (road information), and therefore the steering reaction force generated by the reaction motor also reflects the road information. Thus, the driver can grasp the road information as the steering reaction force.

The driver is informed of accurate road information through the steering wheel as tactile feedback, and can therefore perform a steering operation more quickly and more accurately. Further, a feeling of security in driving is enhanced. Therefore, a further improvement is desired for informing the driver of the road condition more appropriately as the steering reaction force (tactile feedback).

SUMMARY OF THE INVENTION

It is one object of the present invention to provide a vehicle control apparatus capable of informing a driver of a road condition more appropriately as a steering reaction force.

A vehicle control apparatus according to one aspect of the present invention is a vehicle control apparatus configured to control a motor based on a command value to be calculated based on a steering condition. The motor is a source of a driving force to be applied to a steering mechanism of a vehicle. The vehicle control apparatus includes a first calculation circuit, a second calculation circuit, and a third calculation circuit. The first calculation circuit is configured to calculate a first component of the command value based on at least a steering torque. The second calculation circuit is configured to calculate a target rotation angle of a rotating body based on a basic drive torque, which is a total sum of the steering torque and the first component. The rotating body is configured to rotate in association with a turning operation of a steered wheel. The third calculation circuit is configured to calculate a second component of the command value through feedback control performed so that an actual rotation angle of the rotating body equals the target rotation angle.

The second calculation circuit includes an ideal axial force calculation circuit, an estimated axial force calculation circuit, a blending calculation circuit, and a subtractor. The ideal axial force calculation circuit is configured to calculate an ideal axial force based on the target rotation angle. The estimated axial force calculation circuit is configured to calculate, as an estimated axial force, an axial force applied to the steered wheel based on a state variable that reflects vehicle behavior or a road condition. The blending calculation circuit is configured to calculate a final axial force to be reflected in a final basic drive torque as a reaction force component for the final basic drive torque by summing up a value obtained by multiplying the ideal axial force by a blending ratio and a value obtained by multiplying the estimated axial force by a blending ratio. The blending ratios are set individually based on the state variable that reflects the vehicle behavior or the road condition or based on the steering condition. The subtractor is configured to calculate an axial force deviation, which is a difference between the ideal axial force and the estimated axial force. The first calculation circuit is configured to change the first component of the command value in response to the axial force deviation.

The axial force deviation between the ideal axial force and the estimated axial force reflects the road condition. For example, when the vehicle is traveling along a low-friction road, the axial force deviation is likely to occur between the ideal axial force and the estimated axial force. The axial force deviation has a larger value as a road grip decreases. According to the configuration described above, the first component of the command value for the motor is changed in response to the axial force deviation, thereby calculating a command value that reflects the road condition more appropriately. Therefore, the motor generates a driving force that reflects the road condition more appropriately. Thus, the driver can acquire a more appropriate steering reaction force in response to the road condition as tactile feedback.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Description is given of a vehicle control apparatus according to a first embodiment of the present invention, which is applied to a steer-by-wire type steering system.

Figure 1:
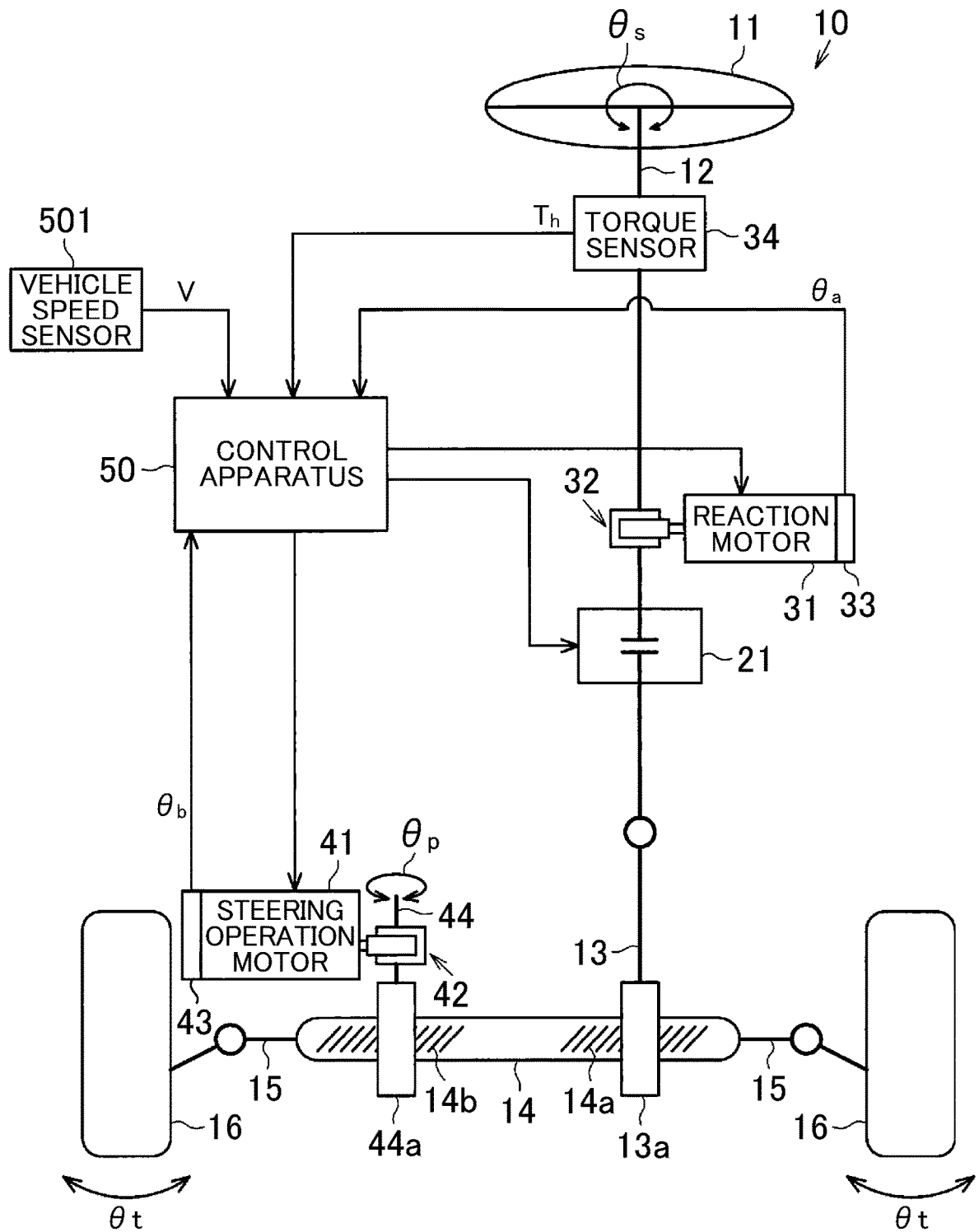
FIG. 1 is a configuration diagram of a steer-by-wire type steering system on which a vehicle control apparatus according to a first embodiment is mounted.

As illustrated in FIG. 1, a steering system 10 for a vehicle includes a steering shaft 12 coupled to a steering wheel 11. A pinion shaft 13 is provided at the end of the steering shaft 12 that is located opposite to the steering wheel 11. Pinion teeth 13a of the pinion shaft 13 mesh with rack teeth 14a of a steering operation shaft 14 extending in a direction that intersects the pinion shaft 13. Right and left steered wheels 16 and 16 are coupled to both ends of the steering operation shaft 14 via tie rods 15 and 15, respectively. The steering shaft 12, the pinion shaft 13, and the steering operation shaft 14 function as a power transmission path between the steering wheel 11 and each of the steered wheels 16 and 16. That is, the steering operation shaft 14 performs linear motion along with a rotational operation of the steering wheel 11, thereby changing a steered angle θt of each of the steered wheels 16 and 16.

The steering system 10 includes a clutch 21. The clutch 21 is provided on the steering shaft 12. An electromagnetic clutch is employed as the clutch 21. The electromagnetic clutch connects and disconnects power through connection and disconnection of electric power for an exciting coil.

When the clutch 21 is disengaged, the power transmission path between the steering wheel 11 and each of the steered wheels 16 and 16 is disconnected mechanically. When the clutch 21 is engaged, the power transmission path between the steering wheel 11 and each of the steered wheels 16 and 16 is connected mechanically.

The steering system 10 includes a reaction motor 31, a speed reducing mechanism 32, a rotation angle sensor 33, and a torque sensor 34 as a structure for generating a steering reaction force (reaction unit). The steering reaction force is a force (torque) to be applied in a direction opposite to a direction of a driver's operation of the steering wheel 11. By applying the steering reaction force to the steering wheel 11, the driver can acquire appropriate tactile feedback.

The reaction motor 31 is a source of the steering reaction force. For example, a three-phase (U, V, W) brushless motor is employed as the reaction motor 31. The reaction motor 31 (to be exact, its rotation shaft) is coupled to the steering shaft 12 via the speed reducing mechanism 32. The speed reducing mechanism 32 is provided at a part of the steering shaft 12 that is located on the steering wheel 11 side with respect to the clutch 21. A torque of the reaction motor 31 is applied to the steering shaft 12 as the steering reaction force.

The rotation angle sensor 33 is provided on the reaction motor 31. The rotation angle sensor 33 detects a rotation angle $θ_a$ of the reaction motor 31. The rotation angle $θ_a$ of the reaction motor 31 is used for calculating a steering angle $θ_s$. The reaction motor 31 and the steering shaft 12 operate in association with each other via the speed reducing mechanism 32. Therefore, the rotation angle $θ_a$ of the reaction motor 31 is correlated to the steering angle $θ_s$, that is a rotation angle of the steering shaft 12 and furthermore a rotation angle of the steering wheel 11. Thus, the steering angle $θ_s$ can be determined based on the rotation angle $θ_a$ of the reaction motor 31.

The torque sensor 34 detects a steering torque $T_h$ applied to the steering shaft 12 through a rotational operation of the steering wheel 11. The torque sensor 34 is provided at a part of the steering shaft 12 that is located on the steering wheel 11 side with respect to the speed reducing mechanism 32.

The steering system 10 includes a steering operation motor 41, a speed reducing mechanism 42, and a rotation angle sensor 43 as a structure for generating a steering operation force (steering operation unit) that is power for turning the steered wheels 16 and 16.

The steering operation motor 41 is a source of the steering operation force. For example, a three-phase brushless motor is employed as the steering operation motor 41. The steering operation motor 41 (to be exact, its rotation shaft) is coupled to a pinion shaft 44 via the speed reducing mechanism 42. Pinion teeth 44a of the pinion shaft 44 mesh with rack teeth 14b of the steering operation shaft 14. A torque of the steering operation motor 41 is applied to the steering operation shaft 14 via the pinion shaft 44 as the steering operation force. In response to rotation of the steering operation motor 41, the steering operation shaft 14 moves along a vehicle width direction (lateral direction in FIG. 1). The rotation angle sensor 43 is provided on the steering operation motor 41. The rotation angle sensor 43 detects a rotation angle $θ_b$ of the steering operation motor 41.

The steering system 10 includes a control apparatus 50. The control apparatus 50 controls the reaction motor 31, the steering operation motor 41, and the clutch 21 based on detection results from various sensors. As the sensors, a vehicle speed sensor 501 is provided in addition to the rotation angle sensor 33, the torque sensor 34, and the rotation angle sensor 43 described above. The vehicle speed sensor 501 is provided on the vehicle to detect a vehicle speed V that is a traveling speed of the vehicle.

The control apparatus 50 executes engagement/disengagement control for switching engagement and disengagement of the clutch 21 based on whether a clutch engagement condition is satisfied. Examples of the clutch engagement condition include a condition that a power switch of the vehicle is OFF. When the clutch engagement condition is not satisfied, the control apparatus 50 switches the clutch 21 from an engaged state to a disengaged state by energizing the exciting coil of the clutch 21. When the clutch engagement condition is satisfied, the control apparatus 50 switches the clutch 21 from the disengaged state to the engaged state by stopping the energization of the exciting coil of the clutch 21.

The control apparatus 50 executes reaction control for generating a steering reaction force based on the steering torque $T_h$ through drive control for the reaction motor 31. The control apparatus 50 calculates a target steering reaction force based on at least the steering torque $T_h$ out of the steering torque $T_h$ and the vehicle speed V, and calculates a target steering angle of the steering wheel 11 based on the calculated target steering reaction force, the steering torque $T_h$, and the vehicle speed V. The control apparatus 50 calculates a steering angle correction amount through feedback control of the steering angle $\theta_s$, which is executed so that the actual steering angle $\theta_s$ follows the target steering angle, and calculates a steering reaction force command value by adding the calculated steering angle correction amount to the target steering reaction force. The control apparatus 50 supplies, to the reaction motor 31, a current necessary to generate a steering reaction force based on the steering reaction force command value.

The control apparatus 50 executes steering operation control for turning the steered wheels 16 and 16 based on a steering condition through drive control for the steering operation motor 41. The control apparatus 50 calculates a pinion angle $\theta_p$ that is an actual rotation angle of the pinion shaft 44 based on the rotation angle $\theta_b$ of the steering operation motor 41 that is detected through the rotation angle sensor 43. The pinion angle $\theta_p$ is a value that reflects the steered angle $\theta_t$ of each of the steered wheels 16 and 16. The control apparatus 50 calculates a target pinion angle by using the target steering angle described above. Then, the control apparatus 50 determines a deviation between the target pinion angle and the actual pinion angle $\theta_p$, and controls power supply to the steering operation motor 41 so as to eliminate the deviation.

Figure 2:
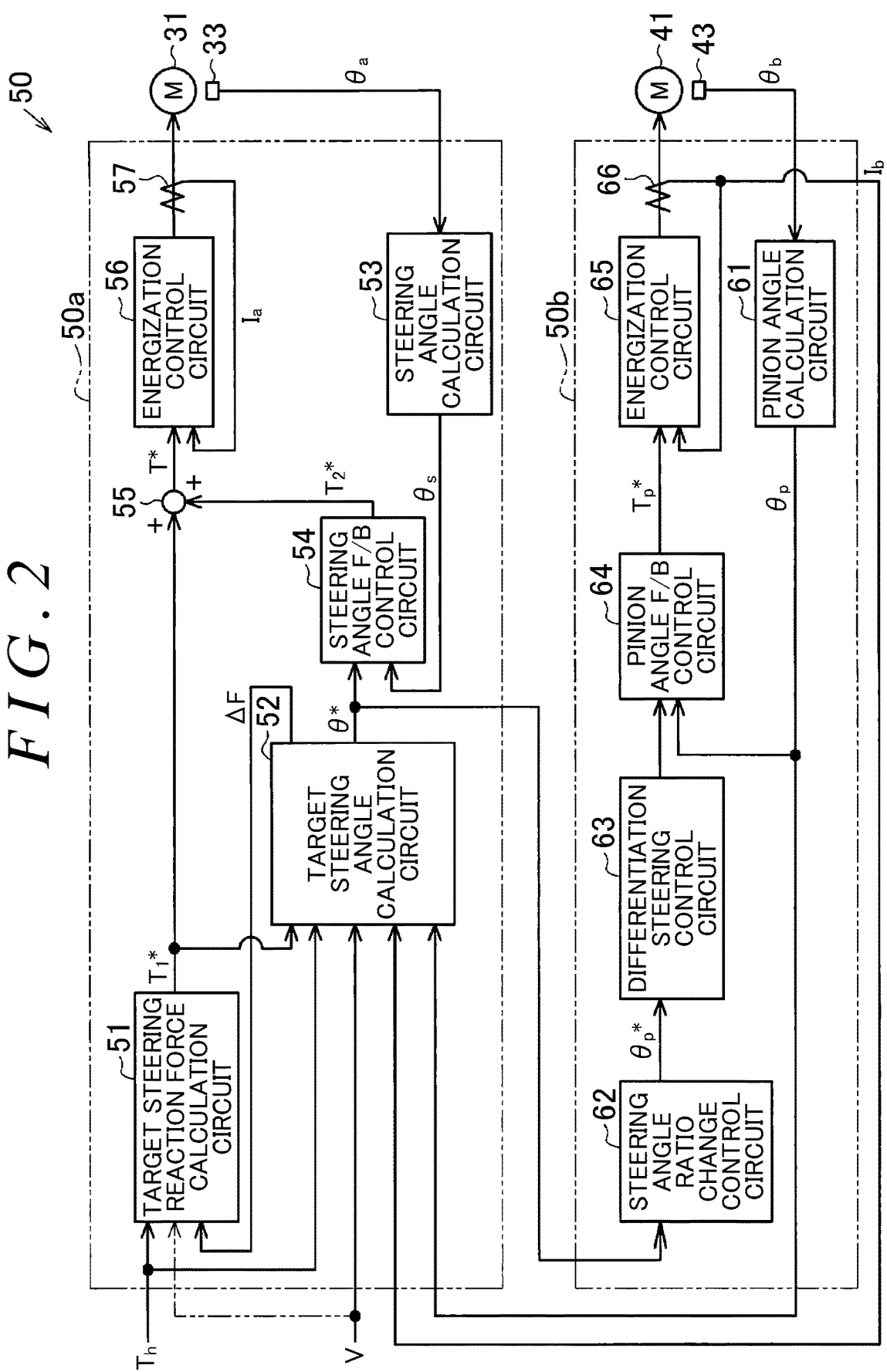
FIG. 2 is a control block diagram of an electronic control apparatus according to the first embodiment.

Next, a detailed configuration of the control apparatus 50 is described. As illustrated in FIG. 2, the control apparatus 50 includes a reaction control circuit 50a configured to execute the reaction control, and a steering operation control circuit 50b configured to execute the steering operation control. The reaction control circuit 50a includes a target steering reaction force calculation circuit 51, a target steering angle calculation circuit 52, a steering angle calculation circuit 53, a steering angle feedback control circuit 54, an adder 55, and an energization control circuit 56.

The target steering reaction force calculation circuit 51 calculates a target steering reaction force $T_1^*$ based on the steering torque $T_h$. The target steering reaction force calculation circuit 51 may calculate the target steering reaction force $T_1^*$ in consideration of the vehicle speed V.

The target steering angle calculation circuit 52 calculates a target steering angle $\theta^*$ of the steering wheel 11 based on the target steering reaction force $T_1^*$, the steering torque $T_h$, and the vehicle speed V. The target steering angle calculation circuit 52 has an ideal model that defines an ideal steering angle based on a basic drive torque (input torque), which is the total sum of the target steering reaction force $T_1$ and the steering torque $T_h$. The ideal model is obtained by modeling a steering angle corresponding to an ideal steered angle based on the basic drive torque through an experiment or the like in advance. The target steering angle calculation circuit 52 determines the basic drive torque by adding the target steering reaction force $T_1$ and the steering torque $T_h$ together, and calculates the target steering angle $\theta^*$ from the basic drive torque based on the ideal model.

The steering angle calculation circuit 53 calculates the actual steering angle $\theta_s$ of the steering wheel 11 based on the rotation angle $\theta_a$ of the reaction motor 31 that is detected through the rotation angle sensor 33. The steering angle feedback control circuit 54 calculates a steering angle correction amount $T_2^*$ through feedback control of the steering angle $\theta_s$ so that the actual steering angle $\theta_s$ follows the target steering angle $\theta^*$. The adder 55 calculates a steering reaction force command value $T^*$ by adding the steering angle correction amount $T_2^*$ to the target steering reaction force $T_1^*$.

The energization control circuit 56 supplies electric power to the reaction motor 31 based on the steering reaction force command value $T^*$. Specifically, the energization control circuit 56 calculates a current command value for the reaction motor 31 based on the steering reaction force command value $T^*$. The energization control circuit 56 detects an actual current value $I_a$ generated in a power supply path to the reaction motor 31 through a current sensor 57 provided in the power supply path. The current value $I_a$ is a value of an actual current supplied to the reaction motor 31. Then, the energization control circuit 56 determines a deviation between the current command value and the actual current value $I_a$, and controls power supply to the reaction motor 31 so as to eliminate the deviation (feedback control of the current value $I_a$). Thus, the reaction motor 31 generates a torque based on the steering reaction force command value $T^*$. The driver can acquire appropriate tactile feedback in response to a road reaction force.

As illustrated in FIG. 2, the steering operation control circuit 50b includes a pinion angle calculation circuit 61, a steering angle ratio change control circuit 62, a differentiation steering control circuit 63, a pinion angle feedback control circuit 64, and an energization control circuit 65.

The pinion angle calculation circuit 61 calculates the pinion angle $\theta_p$ that is an actual rotation angle of the pinion shaft 13 based on the rotation angle $\theta_b$ of the steering operation motor 41 that is detected through the rotation angle sensor 43. As described above, the steering operation motor 41 and the pinion shaft 13 operate in association with each other via the speed reducing mechanism 42. Therefore, there is a correlation between the rotation angle $\theta_b$ of the steering operation motor 41 and the pinion angle $\theta_p$. By using the correlation, the pinion angle $\theta_p$ can be determined from the rotation angle $\theta_b$ of the steering operation motor 41. As described above, the pinion shaft 13 meshes with the steering operation shaft 14. Therefore, there is also a correlation between the pinion angle $\theta_p$ and the movement amount of the steering operation shaft 14.

That is, the pinion angle $\theta_p$ is a value that reflects the steered angle $\theta t$ of each of the steered wheels 16 and 16.

The steering angle ratio change control circuit 62 sets a steering angle ratio, which is the ratio of the steered angle $\theta t$ to the steering angle $\theta_s$, based on a traveling condition of the vehicle (for example, the vehicle speed V), and calculates a target pinion angle based on the set steering angle ratio. The steering angle ratio change control circuit 62 calculates a target pinion angle $\theta_p^*$ so that the steered angle θt increases relative to the steering angle $\theta_s$ as the vehicle speed V decreases or that the steered angle θt decreases relative to the steering angle $\theta_s$ as the vehicle speed V increases. In order to achieve the steering angle ratio to be set based on the traveling condition of the vehicle, the steering angle ratio change control circuit 62 calculates a correction angle for the target steering angle θ*, and adds the calculated correction angle to the target steering angle θ*, thereby calculating the target pinion angle $\theta_p^*$ based on the steering angle ratio.

The differentiation steering control circuit 63 calculates a change speed of the target pinion angle $\theta_p^*$ (steered speed) by differentiating the target pinion angle $\theta_p^*$. The differentiation steering control circuit 63 calculates a correction angle for the target pinion angle $\theta_p^*$ by multiplying the change speed of the target pinion angle $\theta_p^*$ by a gain. The differentiation steering control circuit 63 calculates a final target pinion angle $\theta_p^*$ by adding the correction angle to the target pinion angle $\theta_p^*$. A delay in the steering operation is adjusted by advancing the phase of the target pinion angle $\theta_p^*$ calculated by the steering angle ratio change control circuit 62. That is, a steering operation response is secured based on the steered speed.

The pinion angle feedback control circuit 64 calculates a pinion angle command value $T_p^*$ through feedback control (proportional-integral-derivative (PID) control) of the pinion angle $\theta_p$ so that the actual pinion angle $\theta_p$ follows the final target pinion angle $\theta_p^*$ calculated by the differentiation steering control circuit 63.

The energization control circuit 65 supplies electric power to the steering operation motor 41 based on the pinion angle command value $T_p^*$. Specifically, the energization control circuit 65 calculates a current command value for the steering operation motor 41 based on the pinion angle command value $T_p^*$. The energization control circuit 65 detects an actual current value $I_b$ generated in a power supply path to the steering operation motor 41 through a current sensor 66 provided in the power supply path. The current value $I_b$ is a value of an actual current supplied to the steering operation motor 41. Then, the energization control circuit 65 determines a deviation between the current command value and the actual current value $I_b$, and controls power supply to the steering operation motor 41 so as to eliminate the deviation (feedback control of the current value $I_b$). Thus, the steering operation motor 41 rotates by an angle based on the pinion angle command value $T_p^*$.

Figure 3:
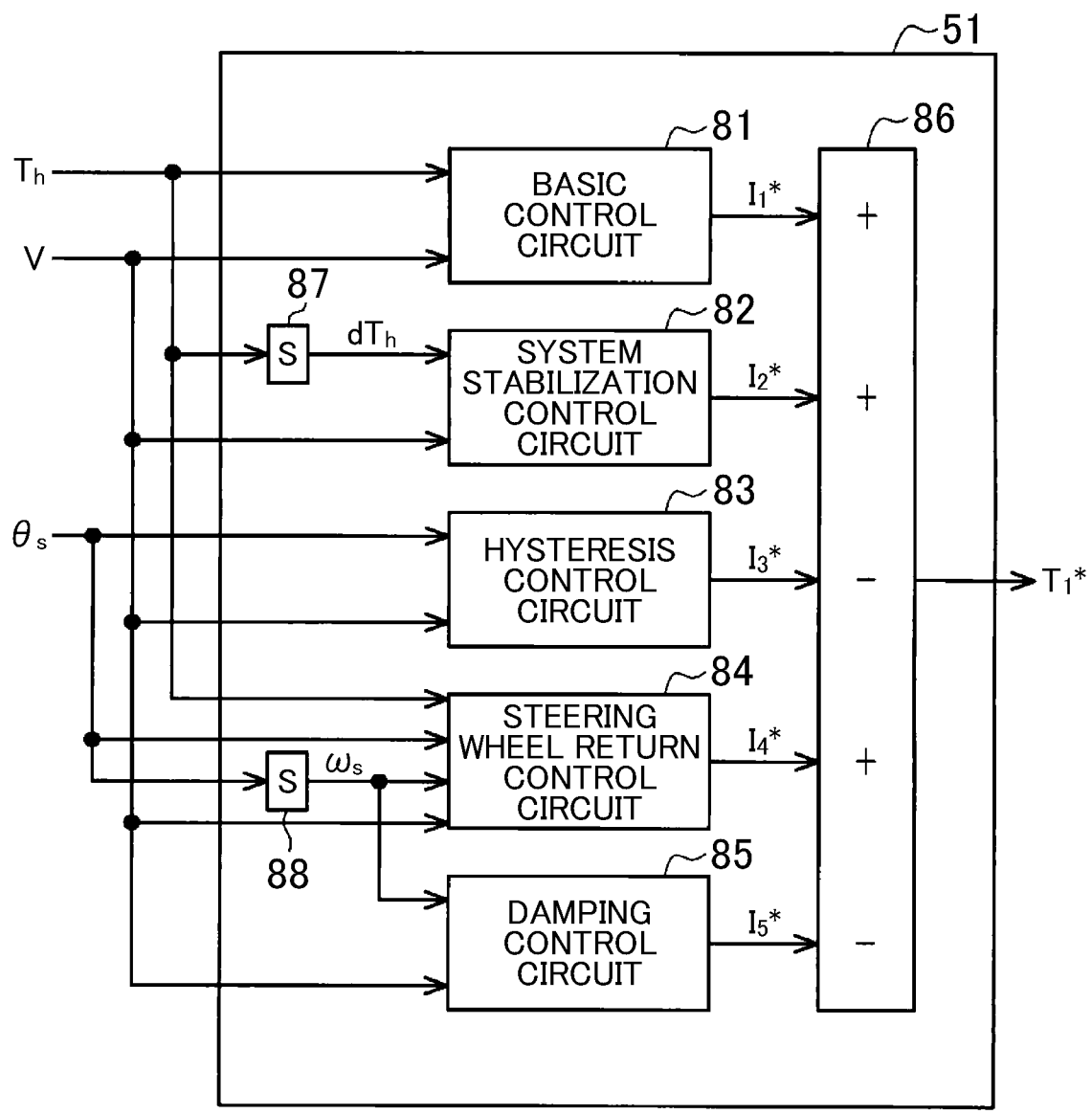
FIG. 3 is a control block diagram of a target steering reaction force calculation circuit according to the first embodiment.

Next, the target steering reaction force calculation circuit 51 is described in detail. As illustrated in FIG. 3, the target steering reaction force calculation circuit 51 includes a basic control circuit 81, a system stabilization control circuit 82, a hysteresis control circuit 83, a steering wheel return control circuit 84, a damping control circuit 85, a calculator 86, and two differentiators 87 and 88.

The differentiator 87 calculates a steering torque derivative $dT_h$ by differentiating the steering torque $T_h$. The differentiator 88 calculates a steering speed $\omega_s$ by differentiating the steering angle $\theta_s$. The basic control circuit 81 calculates a basic control amount $I_1^*$ based on the steering torque $T_h$ and the vehicle speed V. The basic control amount $I_1^*$ is a fundamental component (current value) for generating a target steering reaction force of an appropriate degree based on the steering torque $T_h$ and the vehicle speed V.

The system stabilization control circuit 82 calculates a stabilization control amount $I_2^*$ (current value) based on the steering torque derivative $dT_h$ and the vehicle speed V. The stabilization control amount $I_2^*$ is a compensation amount for stabilizing the system by suppressing a resonance characteristic. An overall control system of the steering system 10 is stabilized by correcting the basic control amount $I_1^*$ with the stabilization control amount $I_2^*$.

The hysteresis control circuit 83 calculates a hysteresis control amount $I_3^*$ that is a compensation amount for extending a tuning range of a target steering characteristic or a steering feel or for optimizing a hysteresis characteristic caused by friction during the steering operation. The hysteresis control circuit 83 calculates the hysteresis control amount $I_3^*$ based on the steering angle $\theta_s$ and the vehicle speed V. The hysteresis control amount $I_3^*$ has a hysteresis characteristic for a change in the steering angle $\theta_s$.

The steering wheel return control circuit 84 calculates a steering wheel return control amount $I_4^*$ (current value) based on the steering torque $T_h$, the vehicle speed V, the steering angle $\theta_s$, and the steering speed $\omega_s$. The steering wheel return control amount $I_4^*$ is a compensation amount for compensating a return characteristic of the steering wheel 11. By correcting the basic control amount $I_1^*$ with the steering wheel return control amount $I_4^*$ compensation is made for excess or deficiency of a self-aligning torque due to a road reaction force. This is because a torque in a direction in which the steering wheel 11 is returned to its neutral position is generated based on the steering wheel return control amount $I_4^*$.

The damping control circuit 85 calculates a damping control amount $I_5^*$ (current value) based on the steering speed $\omega_s$ and the vehicle speed V. The damping control amount $I_5^*$ is a compensation amount for compensating the viscosity of the steering system 10. For example, small vibrations to be transmitted to the steering wheel 11 are reduced by correcting the basic control amount $I_1^*$ with the damping control amount $I_5^*$.

The calculator 86 calculates the target steering reaction force $T_1^*$ (current value) by adding the stabilization control amount $I_2^*$ and the steering wheel return control amount $I_4^*$ to the basic control amount $I_1^*$ and subtracting the hysteresis control amount $I_3^*$ and the damping control amount $I_5^*$ from the basic control amount $I_1^*$ as correction processing for the basic control amount $I_1^*$.

Next, the target steering angle calculation circuit 52 is described in detail. As described above, the target steering angle calculation circuit 52 calculates the target steering angle θ* based on the ideal model from the basic drive torque, which is the total sum of the target steering reaction force $T_1^*$ and the steering torque $T_h$. The ideal model is a model using the fact that a basic drive torque $T_{in}^*$ that is a torque applied to the steering shaft 12 is represented by Expression (1) below.

$$T_{in}^* = J\theta^{*\prime\prime} + C\theta^{*\prime} + K\theta^* \tag{1}$$

In Expression (1), "J" represents a moment of inertia of each of the steering wheel 11 and the steering shaft 12, "C" represents a coefficient of viscosity (coefficient of friction) corresponding to, for example, friction of the steering operation shaft 14 against a housing, and "K" represents a spring modulus assuming the steering wheel 11 and the steering shaft 12 as springs.

As understood from Expression (1), the basic drive torque $T_{in}^*$ is obtained by adding together a value obtained by multiplying a second-order time derivative $\theta^{*\prime\prime}$ of the target steering angle θ* by the moment of inertia J, a value obtained by multiplying a first-order time derivative $\theta^{*\prime}$ of the target steering angle θ* by the coefficient of viscosity C, and a value obtained by multiplying the target steering angle θ* by the spring modulus K. The target steering angle calculation circuit 52 calculates the target steering angle θ* in accordance with the ideal model based on Expression (1).

Figure 4:
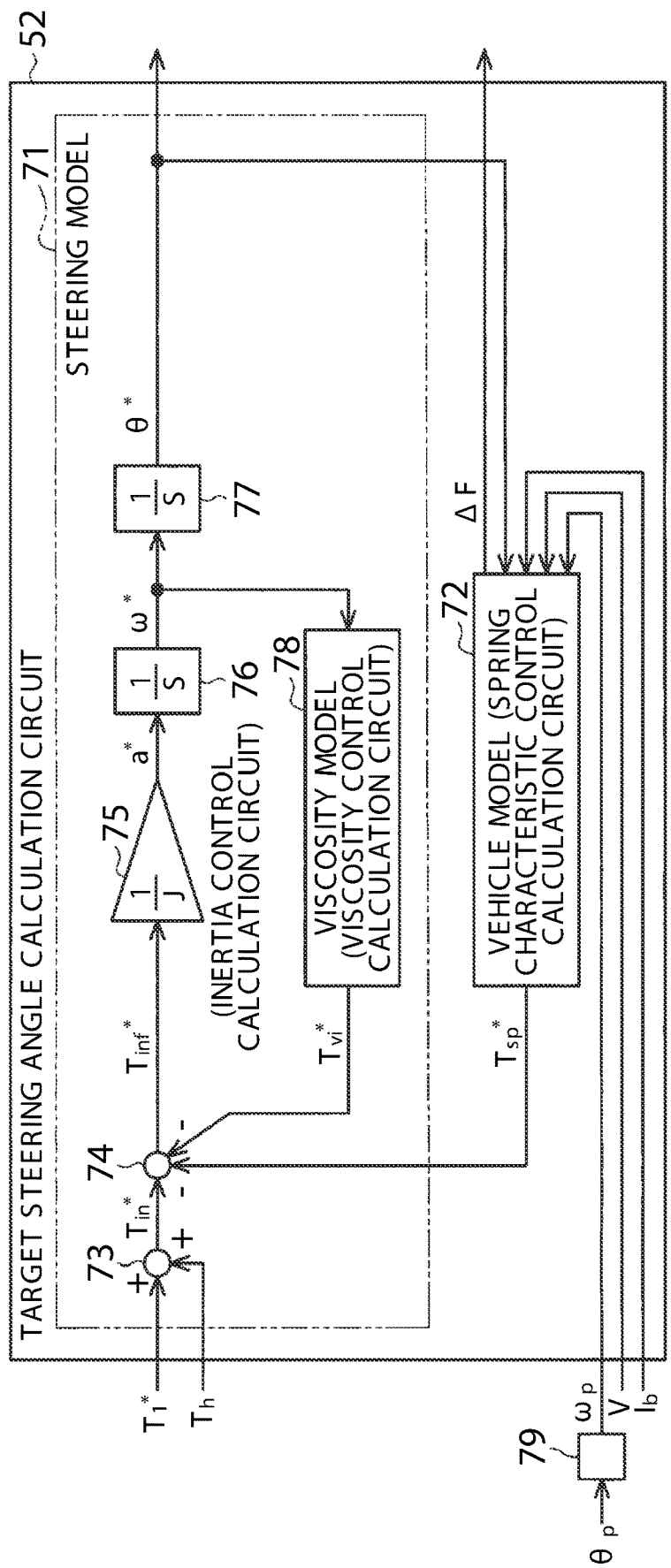
FIG. 4 is a control block diagram of a target steering angle calculation circuit according to the first embodiment.

As illustrated in FIG. 4, the ideal model based on Expression (1) is divided into a steering model 71 and a vehicle model 72. The steering model 71 is tuned based on characteristics of the components of the steering system 10, such as the steering shaft 12 and the reaction motor 31. The steering model 71 includes an adder 73, a subtractor 74, an inertia model 75, a first integrator 76, a second integrator 77, and a viscosity model 78.

The adder 73 calculates the basic drive torque $T_{in}^*$ by adding the target steering reaction force $T_1^*$ and the steering torque $T_h$ together. The subtractor 74 calculates a final basic drive torque $T_{inf}^*$ by subtracting a viscosity component $T_{vi}^*$ and a spring component $T_{sp}^*$ described later from the basic drive torque $T_{in}^*$ calculated by the adder 73.

The inertia model 75 functions as an inertia control calculation circuit corresponding to the inertia term of Expression (1). The inertia model 75 calculates a steering angle acceleration α* by multiplying the final basic drive torque $T_{inf}^*$ calculated by the subtractor 74 and the inverse of the moment of inertia J together.

The first integrator 76 calculates a steering angle speed ω* by integrating the steering angle acceleration α* calculated by the inertia model 75. The second integrator 77 calculates the target steering angle θ* by integrating the steering angle speed ω* calculated by the first integrator 76. The target steering angle θ* is an ideal rotation angle of the steering wheel 11 (steering shaft 12) based on the steering model 71.

The viscosity model 78 functions as a viscosity control calculation circuit corresponding to the viscosity term of Expression (1). The viscosity model 78 calculates the viscosity component $T_{vi}^*$ of the final basic drive torque $T_{inf}^*$ by multiplying the steering angle speed ω* calculated by the first integrator 76 and the coefficient of viscosity C together.

The vehicle model 72 is tuned based on characteristics of the vehicle on which the steering system 10 is mounted. A vehicle-side characteristic that influences the steering characteristic is determined based on, for example, specifications of a suspension and wheel alignment and a grip force (friction force) of each of the steered wheels 16 and 16. The vehicle model 72 functions as a spring characteristic control calculation circuit corresponding to the spring term of Expression (1). The vehicle model 72 calculates the spring component $T_{sp}^*$ (spring reaction torque) of the final basic drive torque $T_{inf}^*$ by multiplying the target steering angle θ* calculated by the second integrator 77 and the spring modulus K together.

When the vehicle model 72 calculates the spring component $T_{sp}^*$, the vehicle speed V and the current value $I_b$ of the steering operation motor 41 that is detected through the current sensor 66 are taken into consideration. The vehicle model 72 acquires a pinion angle speed $ω_p$. The pinion angle speed $ω_p$ is obtained by the pinion angle $θ_p$ calculated by the pinion angle calculation circuit 61 being differentiated by a differentiator 79 provided in the control apparatus 50. The pinion shaft 13 meshes with the steering operation shaft 14. Therefore, there is a correlation between a change speed of the pinion angle $θ_p$ (pinion angle speed $ω_p$) and a moving speed of the steering operation shaft 14 (steered speed). That is, the pinion angle speed $ω_p$ is a value that reflects the steered speed of each of the steered wheels 16 and 16. The steered speed may be determined from the pinion angle speed $ω_p$ by using the correlation between the pinion angle speed $ω_p$ and the steered speed.

According to the target steering angle calculation circuit 52 having the configuration described above, the relationship between the basic drive torque $T_{in}^*$ and the target steering angle θ* can be tuned directly and furthermore a desired steering characteristic can be achieved by adjusting the moment of inertia J and the coefficient of viscosity C of the steering model 71 and the spring modulus K of the vehicle model 72.

The target pinion angle $θ_p^*$ is calculated by using the target steering angle θ* calculated from the basic drive torque $T_{in}^*$ based on the steering model 71 and the vehicle model 72. Then, feedback control is performed so that the actual pinion angle $θ_p$ equals the target pinion angle $θ_p^*$. As described above, there is a correlation between the pinion angle $θ_p$ and the steered angle θt of each of the steered wheels 16 and 16. Therefore, the turning operation of each of the steered wheels 16 and 16 based on the basic drive torque $T_{in}^*$ is also determined by the steering model 71 and the vehicle model 72. That is, the steering feel of the vehicle is determined by the steering model 71 and the vehicle model 72. Thus, a desired steering feel can be achieved by adjusting the steering model 71 and the vehicle model 72.

The steering reaction force (tactile feedback to be acquired through a steering operation), which is a force (torque) to be applied in a direction opposite to the driver's steering direction, is only based on the target steering angle θ*. That is, the steering reaction force does not change in response to a road condition (for example, the possibility of a slip that may occur on a road). Therefore, it is difficult for the driver to grasp the road condition through the steering reaction force. In this example, the vehicle model 72 has the following configuration from the viewpoint of addressing such concerns.

Figure 5:
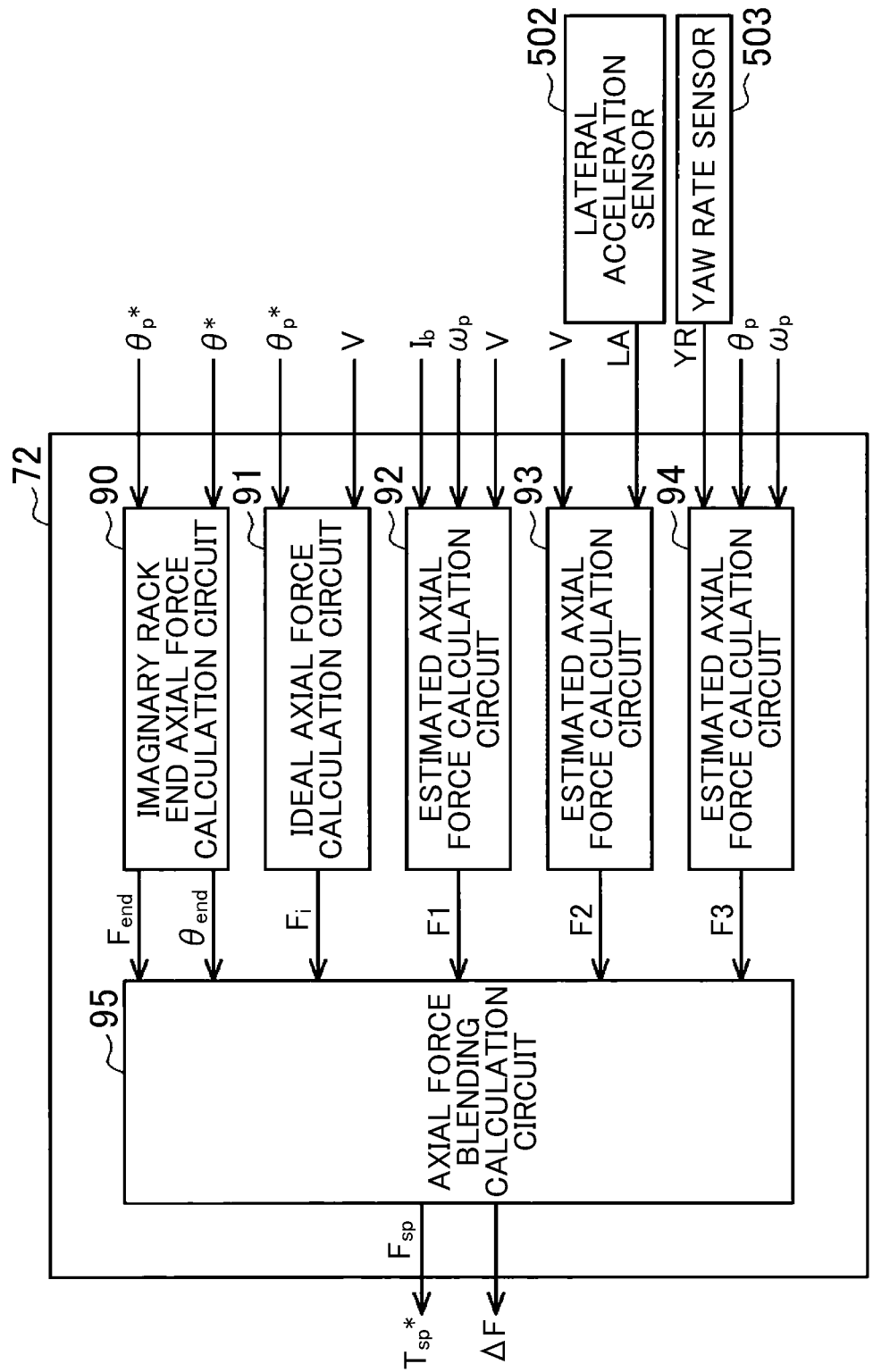
FIG. 5 is a control block diagram of a vehicle model according to the first embodiment.

As illustrated in FIG. 5, the vehicle model 72 includes an imaginary rack end axial force calculation circuit 90, an ideal axial force calculation circuit 91, an estimated axial force calculation circuit 92, an estimated axial force calculation circuit 93, an estimated axial force calculation circuit 94, and an axial force blending calculation circuit 95.

When the operation position of the steering wheel 11 is close to a limit position of a physical operation range, the imaginary rack end axial force calculation circuit 90 calculates an imaginary rack end axial force $F_{end}$ as a correction amount for the basic drive torque $T_{in}^*$ in order to imaginarily limit the operation range of the steering wheel 11 to a range narrower than an original maximum physical steering range. The imaginary rack end axial force $F_{end}$ is calculated from the viewpoint of sharply increasing a torque (steering reaction torque) to be generated in the reaction motor 31 in a direction opposite to the steering direction.

The limit position of the physical operation range of the steering wheel 11 is also a position at which the steering operation shaft 14 reaches the limit of its movable range. When the steering operation shaft 14 reaches the limit of its movable range, there occurs a so-called "end abutment", in which the end of the steering operation shaft 14 (rack end) abuts against the housing. Therefore, the movement range of the rack shaft is physically limited. Thus, the operation range of the steering wheel is also limited.

The imaginary rack end axial force calculation circuit 90 acquires the target steering angle θ* and the target pinion angle $θ_p^*$ calculated by the steering angle ratio change control circuit 62 (see FIG. 2). The imaginary rack end axial force calculation circuit 90 calculates a target steered angle by multiplying the target pinion angle $θ_p^*$ by a predetermined conversion coefficient. The imaginary rack end axial force calculation circuit 90 compares the target steered angle with the target steering angle θ*, and uses, as an imaginary rack end angle $\theta_{end}$, one of the target steered angle and the target steering angle $\theta^*$ that is larger in the absolute value.

When the imaginary rack end angle $\theta_{end}$ reaches an end determination threshold, the imaginary rack end axial force calculation circuit 90 calculates the imaginary rack end axial force $F_{end}$ by using an imaginary rack end map stored in a storage apparatus (not illustrated) of the control apparatus 50. The end determination threshold is set based on a value in the vicinity of the maximum physical steering range of the steering wheel 11 or a value in the vicinity of the maximum movable range of the steering operation shaft 14. The imaginary rack end axial force $F_{end}$ is a correction amount for the final basic drive torque $T_{inf}^*$ and is set to have the same sign as the sign (positive or negative) of the imaginary rack end angle $\theta_{end}$. After the imaginary rack end angle $\theta_{end}$ reaches the end determination threshold, the imaginary rack end axial force $F_{end}$ is set to a larger value as the absolute value of the imaginary rack end angle $\theta_{end}$ increases.

The ideal axial force calculation circuit 91 calculates an ideal axial force which is an ideal value of the axial force to be applied to the steering operation shaft 14 through the steered wheels 16 and 16. The ideal axial force calculation circuit 91 calculates the ideal axial force $F_i$ by using an ideal axial three map stored in the storage apparatus (not illustrated) of the control apparatus 50. The ideal axial force $F_i$ is set to have a larger absolute value as the absolute value of the target steered angle obtained by multiplying the target pinion angle $\theta_p^*$ the predetermined conversion coefficient increases and as the vehicle speed V decreases. The ideal axial force may be calculated based on the target steered angle alone without considering the vehicle speed V.

The estimated axial force calculation circuit 92 calculates an actual axial force F1 (road reaction force) to be applied to the steering operation shaft 14 (steered wheels 16 and 16) based on the current value $I_b$ of the steering operation motor 41. The current value $I_b$ of the steering operation motor 41 changes in response to the occurrence of a difference between the target pinion angle $\theta_p^*$ and the actual pinion angle $\theta_p$ due to a situation in which a disturbance caused by a road condition (road frictional resistance) affects the steered wheels 16. That is, the current value $I_b$ of the steering operation motor 41 reflects an actual road reaction force applied to the steered wheels 16 and 16. Therefore, an axial force that reflects an influence of the road condition can be calculated based on the current value $I_b$ of the steering operation motor 41. The axial force F1 is determined by multiplying the current value $I_b$ of the steering operation motor 41 by a gain that is a coefficient for converting a current value into an axial force (reaction torque).

The estimated axial force calculation circuit 93 estimates and calculates an axial force F2 to be applied to the steering operation shaft 14 based on a lateral acceleration LA detected through a lateral acceleration sensor 502 provided in the vehicle. The axial force F2 is determined by multiplying the lateral acceleration LA by a gain that is a coefficient based on the vehicle speed V. The lateral acceleration LA reflects a road condition such as a road frictional resistance. Therefore, the axial force F2 calculated based on the lateral acceleration LA reflects an actual road condition.

The estimated axial force calculation circuit 94 estimates and calculates an axial force F3 to be applied to the steering operation shaft 14 based on a yaw rate YR detected through a yaw rate sensor 503 provided in the vehicle. The axial force F3 is determined by multiplying together a yaw rate derivative that is a value obtained by differentiating the yaw rate YR and a vehicle speed gain that is a coefficient based on the vehicle speed V. The vehicle speed gain is set to a larger value as the vehicle speed V increases. The yaw rate YR reflects a road condition such as a road frictional resistance. Therefore, the axial force F3 calculated based on the yaw rate YR reflects an actual road condition.

The axial force F3 may be calculated as follows. That is, the estimated axial force calculation circuit 94 determines the axial force F3 by adding at least one of a correction axial force based on the steered angle $\theta t$, a correction axial force based on the steered speed, and a correction axial force based on a steered angle acceleration to a value obtained by multiplying the yaw rate derivative by the vehicle speed gain. The steered angle $\theta t$ is obtained by multiplying the pinion angle $\theta_p$ by a predetermined conversion coefficient. The steered speed may be obtained by differentiating the steered angle $\theta t$ or by converting the pinion angle speed to. The steered angle acceleration may be obtained by differentiating the steered speed or by converting a pinion angle acceleration $\alpha_p$.

The axial force blending calculation circuit 95 calculates a final axial force $F_{sp}$ by summing up the imaginary rack end axial force $F_{end}$, the ideal axial force $F_i$, the axial force F1, the axial force F2, and the axial force F3 at predetermined blending ratios based on various state variables that reflect a traveling condition or a steering condition of the vehicle. The final axial force $F_{sp}$ is used for calculating the spring component $T_{sp}^*$ for the final basic drive torque $T_{inf}^*$. The vehicle model 72 calculates (converts) the spring component $T_{sp}^*$ for the final basic drive torque $T_{inf}^*$ based on the axial force $F_{sp}$.

Figure 6:
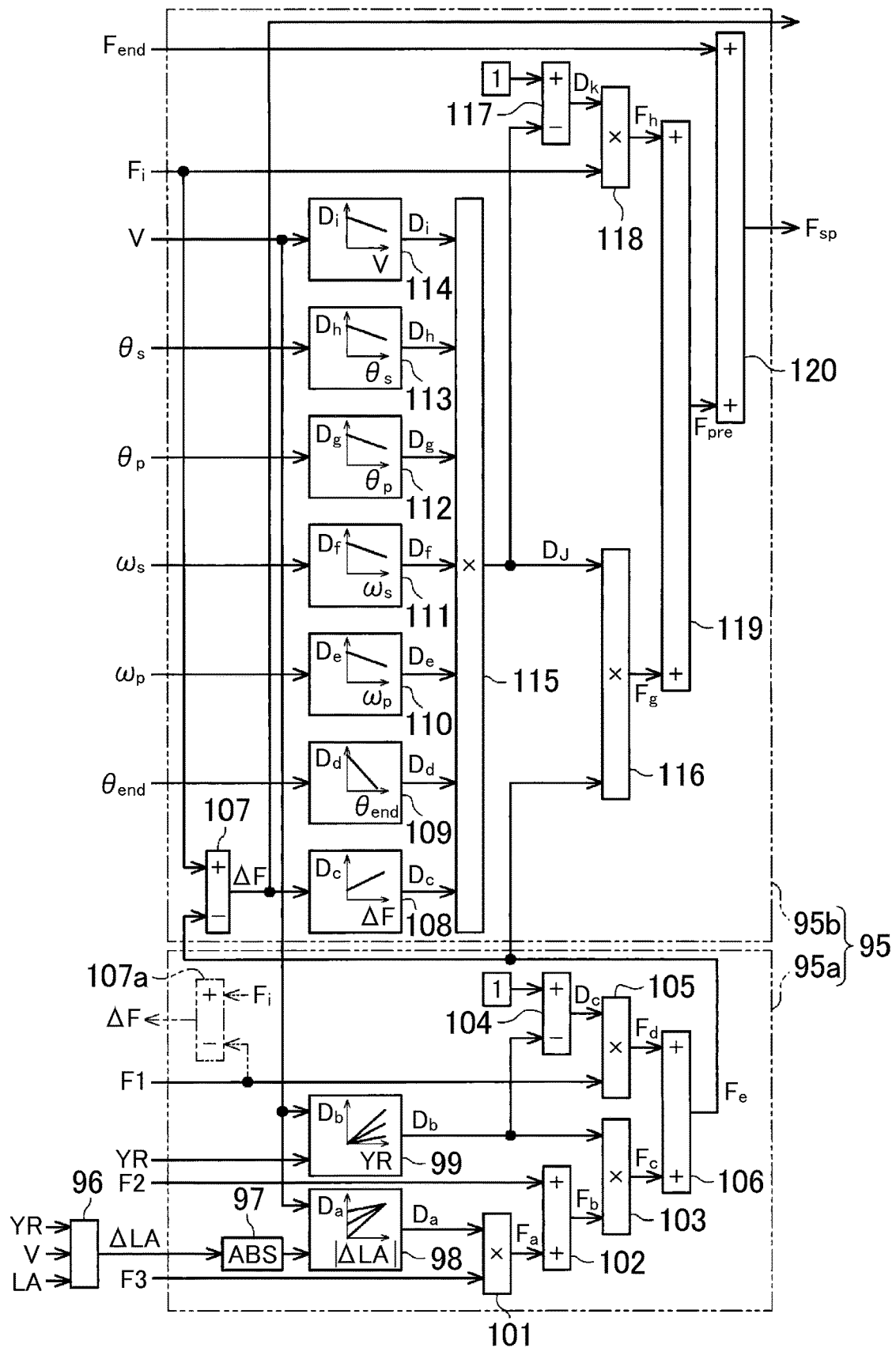
FIG. 6 is a control block diagram of an axial force blending calculation circuit according to the first embodiment.

Next, the axial force blending calculation circuit 95 is described in detail. As illustrated in FIG. 6, the axial force blending calculation circuit 95 includes a first calculation circuit 95a and a second calculation circuit 95b.

The first calculation circuit 95a calculates a more appropriate estimated axial force $F_e$ by summing up, at predetermined blending ratios, the axial forces F1, F2, and F3 estimated and calculated by the estimated axial force calculation circuits 92, 93, and 94, respectively.

The first calculation circuit 95a acquires the axial forces F1, F2, and F3, the yaw rate YR, and a lateral acceleration difference $\Delta LA$. The lateral acceleration difference $\Delta LA$ is calculated by a difference calculation circuit 96 provided in the vehicle model 72. The difference calculation circuit 96 calculates the lateral acceleration difference $\Delta LA$ based on Expression (2) below.

$$\Delta LA = YR \times V - LA \qquad (2)$$

In Expression (2), "YR" represents a yaw rate detected through the yaw rate sensor 503, "V" represents a vehicle speed detected through the vehicle speed sensor 501, and "LA" represents a lateral acceleration detected through the lateral acceleration sensor 502.

The first calculation circuit 95a includes an absolute value calculation circuit 97, blending ratio calculation circuits 98 and 99, multipliers 101, 103, and 105, adders 102 and 106, and a subtractor 104. The absolute value calculation circuit 97 calculates an absolute value $|\Delta LA|$ of the lateral acceleration difference $\Delta LA$ calculated by the difference calculation circuit 96. The blending ratio calculation circuit 98 calculates a blending ratio $D_a$ based on the absolute value $|\Delta LA|$ of the lateral acceleration difference $\Delta LA$. The blending ratio $D_a$ is set to a larger value as the absolute value $|\Delta LA|$ of the lateral acceleration difference $\Delta LA$ increases and as the vehicle speed V increases. The multiplier 101 calculates an axial force $F_a$ after blending by multiplying the axial force F3 based on the yaw rate YR and the blending ratio $D_a$ together. The adder 102 calculates an axial force $F_b$ by adding the axial force F2 based on the lateral acceleration LA and the axial force $F_a$ calculated by the multiplier 101 together.

The blending ratio calculation circuit 99 calculates a blending ratio $D_b$ based on the yaw rate YR. The blending ratio $D_b$ is set to a larger value as the yaw rate YR increases and as the vehicle speed V increases. The multiplier 103 calculates an axial force $F_c$ by multiplying the axial force $F_b$ calculated by the adder 102 and the blending ratio $D_b$ together.

The subtractor 104 calculates a blending ratio $D_c$ by subtracting the blending ratio $D_b$ calculated by the blending ratio calculation circuit 99 from "1", which is a fixed value stored in the storage apparatus of the control apparatus 50. The multiplier 105 calculates an axial force $F_d$ by multiplying the axial force F1 based on the current value $I_b$ of the steering operation motor 41 and the blending ratio $D_c$ together.

The adder 106 calculates the final estimated axial force $F_e$ by adding the axial force $F_d$ calculated by the multiplier 105 and the axial force $F_c$ calculated by the multiplier 103 together. The second calculation circuit 95b calculates the final axial force $F_{sp}$, which is used for calculating the spring component $T_{sp}^*$ for the final basic drive torque $T_{inf}^*$, by summing up the estimated axial force $F_e$ calculated by the first calculation circuit 95a and the ideal axial force $F_i$ calculated by the ideal axial force calculation circuit 91 at predetermined blending ratios based on various state variables that reflect a traveling condition or a steering condition of the vehicle.

The second calculation circuit 95b includes subtractors 107 and 117, blending ratio calculation circuits 108 to 114, multipliers 115, 116, and 118, and adders 119 and 120.

The subtractor 107 calculates an axial force deviation ΔF by subtracting the estimated axial force $F_e$ calculated in a blended manner by the first calculation circuit 95a (adder 106) from the ideal axial force $F_i$ based on the target pinion angle $\theta_p^*$.

The blending ratio calculation circuit 108 calculates a blending ratio Dcc based on the axial force deviation ΔF. The blending ratio Dcc is set to a larger value as the axial force deviation ΔF increases. The blending ratio calculation circuit 109 calculates a blending ratio $D_d$ based on the imaginary rack end angle $\theta_{end}$. The blending ratio calculation circuit 110 calculates a blending ratio $D_e$ based on the pinion angle speed $\omega_p$ (may be converted into the steered speed). The blending ratio calculation circuit 111 calculates a blending ratio $D_f$ based on the steering speed $\omega_s$ obtained by differentiating the steering angle $\theta_s$. The blending ratio calculation circuit 112 calculates a blending ratio $D_g$ based on the pinion angle $\theta_p$. The blending ratio calculation circuit 113 calculates a blending ratio $D_h$ based on the steering angle $\theta_s$. The blending ratio calculation circuit 114 calculates a blending ratio $D_i$ based on the vehicle speed V. The blending ratios $D_d$, $D_e$, $D_f$, $D_g$, $D_h$, and $D_i$ are set to smaller values as the state variables ($\theta_{end}$, $\omega_p$, $\omega_s$, $\theta_p$, $\theta_s$, V) acquired by the respective blending ratio calculation circuits (109 to 114) increase.

The multiplier 115 calculates a blending ratio $D_j$ of the final estimated axial three $F_e$ calculated by the first calculation circuit 95a by multiplying the blending ratios Dcc, $D_d$, $D_e$, $D_f$, $D_g$, $D_h$ and $D_i$ together. The multiplier 116 calculates an estimated axial force $F_g$ after blending by multiplying the final estimated axial force $F_e$ calculated by the first calculation circuit 95a and the blending ratio $D_j$ based on the state variables together.

The subtractor 117 calculates a blending ratio $D_k$ of the ideal axial force $F_i$ by subtracting the blending ratio $D_j$ calculated by the multiplier 115 from "1", which is a fixed value stored in the storage apparatus of the control apparatus 50. The multiplier 118 calculates an ideal axial force $F_h$ after blending by multiplying the ideal axial force $F_i$ calculated by the ideal axial force calculation circuit 91 and the blending ratio $D_k$ together.

The adder 119 calculates an axial force $F_{pre}$ by summing up the ideal axial force $F_h$ after blending and the estimated axial force $F_g$ after blending. The adder 120 calculates the final axial force $F_{sp}$, which is used for calculating the spring component $T_{sp}^*$ for the final basic drive torque $T_{inf}^*$, by summing up the axial force $F_{pre}$ calculated by the adder 119 and the imaginary rack end axial force $F_{end}$. When the imaginary rack end axial force $F_{end}$ is not calculated, the axial force $F_{pre}$ calculated by the adder 119 is used as the final axial force $F_{sp}$, which is used for calculating the spring component $T_{sp}^*$ for the final basic drive torque $T_{inf}^*$.

According to this embodiment, the axial forces F1, F2, and F3 estimated and calculated based on the plurality of types of state variables that reflect vehicle behavior or a road condition and the ideal axial force $F_i$ calculated based on the target pinion angle $\theta_p^*$ (target steered angle) are summed up at the blending ratios set based on the plurality of types of state variables that reflect the vehicle behavior, the steering condition, or the road condition. Thus, the axial force $F_{pre}$ ($F_{sp}$) that reflects the road condition more finely is calculated. When the axial force $F_{pre}$ is reflected in the basic drive torque $T_{in}^*$, a finer steering reaction force in response to the road condition is applied to the steering wheel 11.

Depending on product specifications or the like, there is a demand to further improve the performance of transmission of road information in a tire grip limit range when the vehicle is traveling along a low-friction road or the like. In this example, the basic control circuit 81 has the following configuration.

Figure 7:
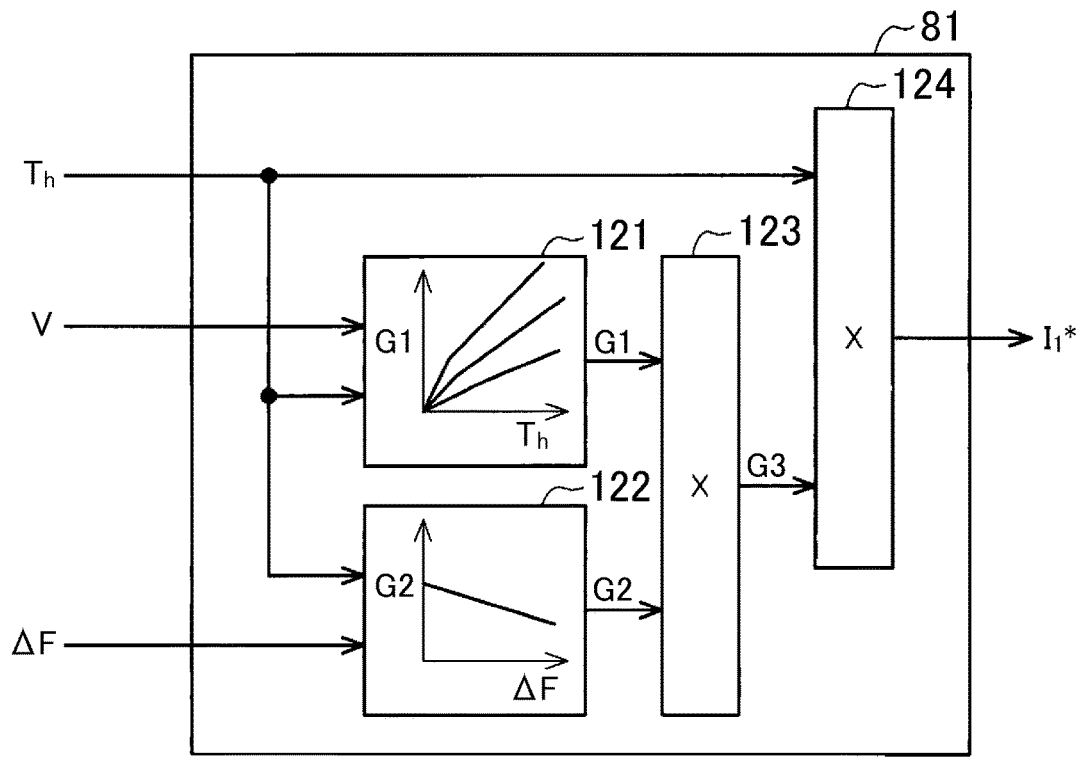
FIG. 7 is a control block diagram of a basic control circuit according to the first embodiment.

As illustrated in FIG. 7, the basic control circuit 81 acquires the steering torque $T_h$, the vehicle speed V, and the axial force deviation ΔF. The axial force deviation ΔF is a difference between the ideal axial force $F_i$ and the estimated axial force $F_e$, which is calculated by the axial force blending calculation circuit 95 (see FIG. 6). The basic control circuit 81 includes two gain calculation circuits 121 and 122 and two multipliers 123 and 124.

The gain calculation circuit 121 calculates a gain G1 by using a map that defines a relationship between the steering torque $T_h$ and the gain G1 depending on the vehicle speed V. The gain G1 is set to a larger value as the steering torque $T_h$ increases. The gain calculation circuit 122 calculates a gain G2 by using a map that defines a relationship between the axial force deviation ΔF and the gain G2. The gain G2 is set to a smaller value as the axial force deviation ΔF increases. The gain calculation circuit 122 may calculate the gain G2 in consideration of the steering torque $T_h$. The multiplier 123 calculates a gain G3 by multiplying the gain G1 and the gain G2 together. The multiplier 124 calculates the basic control amount $I_1^*$ by multiplying the steering torque $T_h$ and the gain G3 together.

The gain G3 reflects the gain G2 based on the axial force deviation ΔF. Therefore, the basic control amount $I_1^*$ obtained by multiplying the steering torque $T_h$ and the gain G3 together and furthermore the target steering reaction force $T_1^*$ based on the basic control amount $I_1^*$ also reflect the axial force deviation ΔF.

Next, actions and effects of the basic control circuit 81 are described. For example, when the vehicle is traveling along a low-friction road such as a wet road or a snowy road, the axial force deviation ΔF is likely to occur between the ideal axial force $F_i$ and the estimated axial force $F_e$. The reason is as follows. That is, the ideal axial force $F_i$ is calculated based on the target pinion angle $\theta_p^*$. Therefore, the ideal axial force $F_i$ is not likely to reflect the road condition. The estimated axial force $F_e$ is calculated based on various state variables. Therefore, the estimated axial force $F_e$ is likely to reflect the road condition. Thus, the ideal axial force $F_i$ only has a value based on the target pinion angle $\theta_p^*$ irrespective of the tire grip condition, whereas the estimated axial force $F_e$ decreases as the road grip decreases. Accordingly, the difference between the ideal axial force $F_i$ and the estimated axial three $F_e$ increases as the road grip decreases. For this reason, the axial force deviation ΔF reflects the road condition.

As in this example, the basic control amount $I_1^*$ is changed in response to the axial force deviation ΔF between the ideal axial force $F_i$ and the estimated axial force $F_e$, thereby calculating a target steering reaction force $T_1^*$ that reflects the road condition more appropriately. Thus, a more appropriate steering reaction force in response to the road grip is applied to the steering wheel 11. The driver feels the steering reaction force applied to the steering wheel 11 as tactile feedback, and can therefore grasp the road condition more accurately.

For example, the gain G2 is set to a smaller value as the axial force deviation ΔF increases along with a decrease in the road grip of the tire. Therefore, the basic control amount $I_1^*$ and furthermore the target steering reaction force $T_1^*$ have smaller values. That is, the steering reaction force to be applied to the steering shaft 12 decreases by an amount corresponding to the subtraction of the hysteresis control amount $I_3$. The steering torque $T_h$ necessary to operate the steering wheel 11 decreases by an amount corresponding to the decrease in the steering reaction force. The driver can grasp, as tactile feedback, a situation in which the road grip of the tire decreases.

Next, a vehicle control apparatus according to a second embodiment of the present invention is described. Depending on product specifications or the like, there is a demand to secure a system stability in the steering system 10 in the tire grip limit range when the vehicle is traveling along a low-friction road or the like. In this example, the target steering reaction force calculation circuit 51 has the following configuration.

Figure 8:
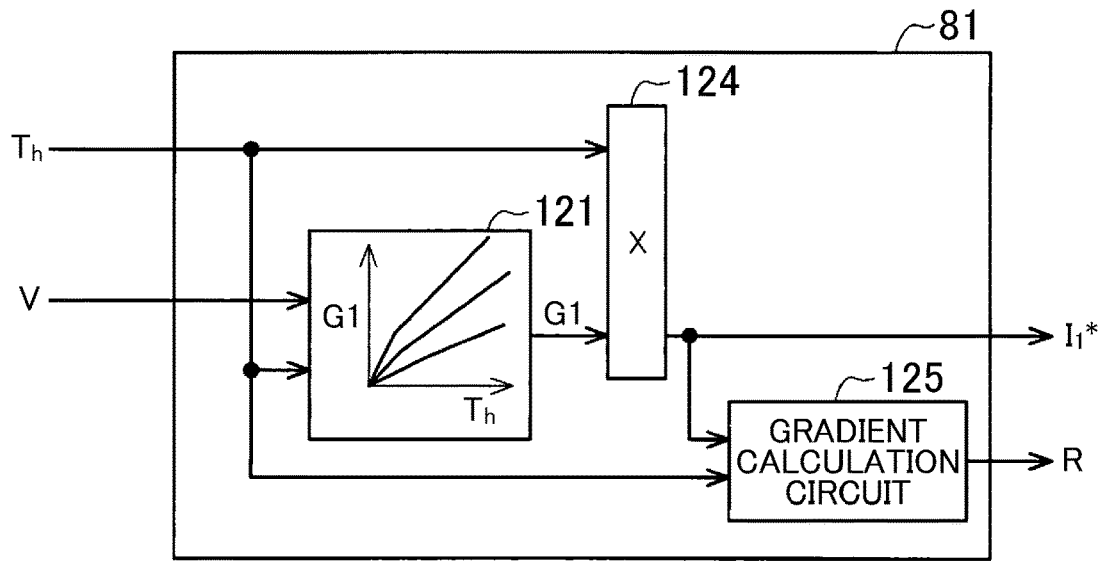
FIG. 8 is a control block diagram of a basic control circuit according to a second embodiment.

As illustrated in FIG. 8, the basic control circuit 81 includes the gain calculation circuit 121, the multiplier 124, and a gradient calculation circuit 125. The multiplier 124 calculates the basic control amount by multiplying the steering torque $T_h$ and the gain G1 together. The gradient calculation circuit 125 calculates a gradient R based on the basic control amount $I_1^*$ and the steering torque $T_h$. The gradient R is the rate of a change in the basic control amount $I_1^*$ relative to the steering torque $T_h$.

Figure 9:
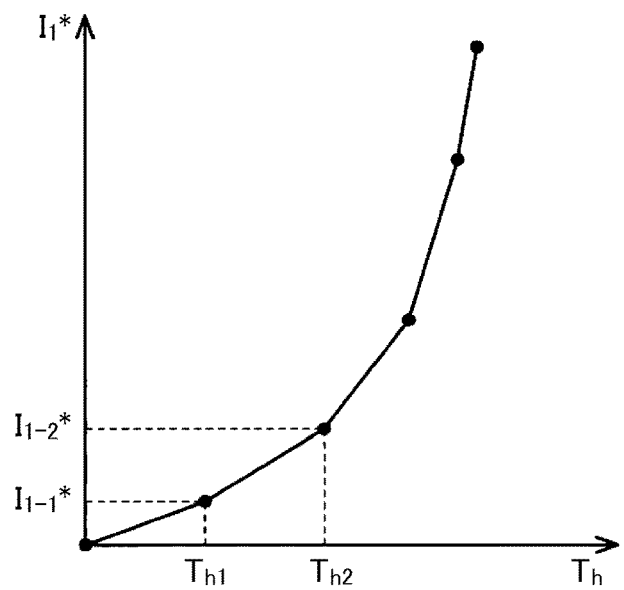
FIG. 9 is a graph illustrating a relationship between a steering torque and a basic control amount according to the second embodiment.

As illustrated in a graph of FIG. 9, for example, when the steering torque $T_h$, changes from a steering torque $T_{h1}$ to a steering torque $T_{h2}$ and the basic control amount $I_1^*$ changes from a basic control amount $I_{1-1}^*$ to a basic control amount $I_{1-2}^*$, the gradient R is determined based on Expression (3) below.

$$R=(I_{1-2}^*-I_{1-1}^*)/(T_{h2}-T_{h1}) \quad (3)$$

Figure 10:
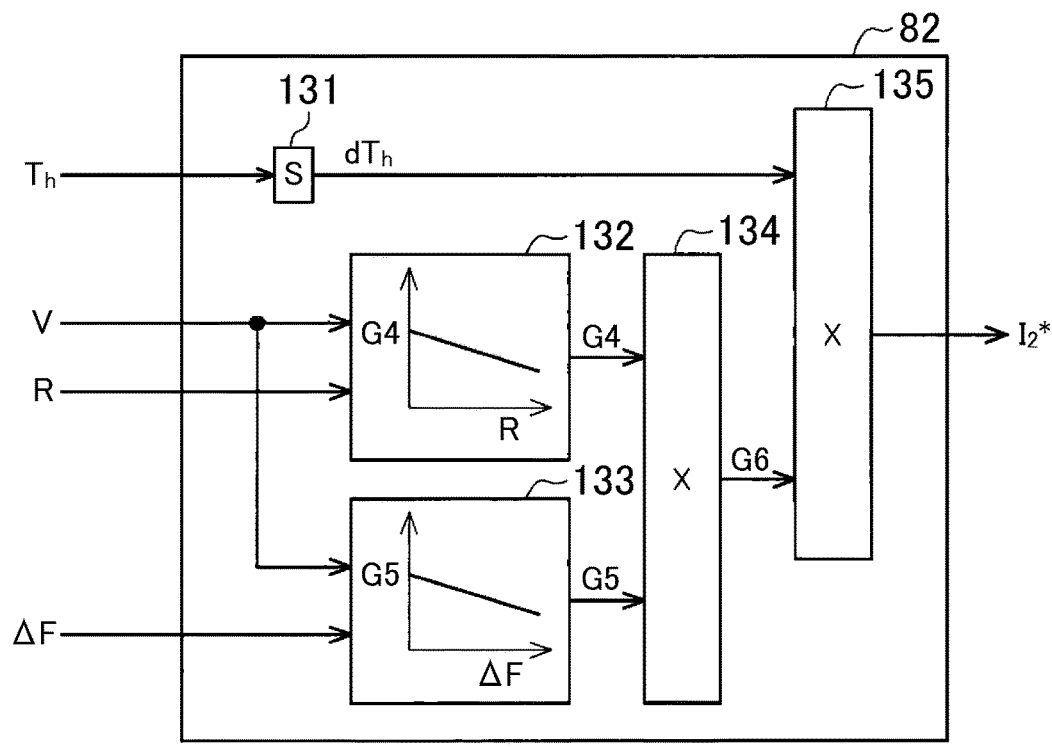
FIG. 10 is a control block diagram of a system stabilization control circuit according to the second embodiment.

As illustrated in FIG. 10, the system stabilization control circuit 82 acquires the steering torque. $T_h$, the vehicle speed V, the gradient R, and the axial force deviation ΔF. The axial force deviation ΔF is a difference between the ideal axial force $F_i$ and the estimated axial force $F_e$, which is calculated by the axial force blending calculation circuit 95 (see FIG. 6). The system stabilization control circuit 82 includes a differentiator 131, two gain calculation circuits 132 and 133, and two multipliers 134 and 135.

The differentiator 131 calculates the steering torque derivative $dT_h$ by differentiating the steering torque $T_h$. The gain calculation circuit 132 calculates a gain G4 by using a map that defines a relationship between the gradient R and the gain G4 depending on the vehicle speed V. The gain G4 is set to a smaller value as the gradient R increases. The gain calculation circuit 133 calculates a gain G5 by using a map that defines a relationship between the axial force deviation ΔF and the gain G5 depending on the vehicle speed V. The gain G5 is set to a smaller value as the axial force deviation ΔF increases. The multiplier 134 calculates a gain G6 by multiplying the gain G4 and the gain G5 together. The multiplier 135 calculates the stabilization control amount $I_2^*$ by multiplying the steering torque derivative $dT_h$ and the gain G6 together.

The gain G6 reflects the gain G5 based on the axial force deviation ΔF. Therefore, the stabilization control amount $I_2^*$ obtained by multiplying the steering torque derivative $dT_h$ and the gain G6 together also reflects the axial force deviation ΔF.

According to this example, the stabilization control amount $I_2^*$ is changed (increased or reduced) in response to the axial force deviation ΔF between the ideal axial force $F_i$ and the estimated axial force $F_e$, thereby attaining a more appropriate stabilization control amount $I_2^*$ based on the road condition. Thus, the system stability in the steering system 10 can be secured more appropriately based on the road condition. The system stability in the tire grip limit range is also secured when the vehicle is traveling along a low-friction road or the like.

Next, a vehicle control apparatus according to a third embodiment is described. Depending on product specifications or the like, there is a demand to reduce a sense of friction in the steering system 10 in the tire grip limit range when the vehicle is traveling along a low-friction road or the like. In this example, the target steering reaction force calculation circuit 51 has the following configuration.

Figure 11:
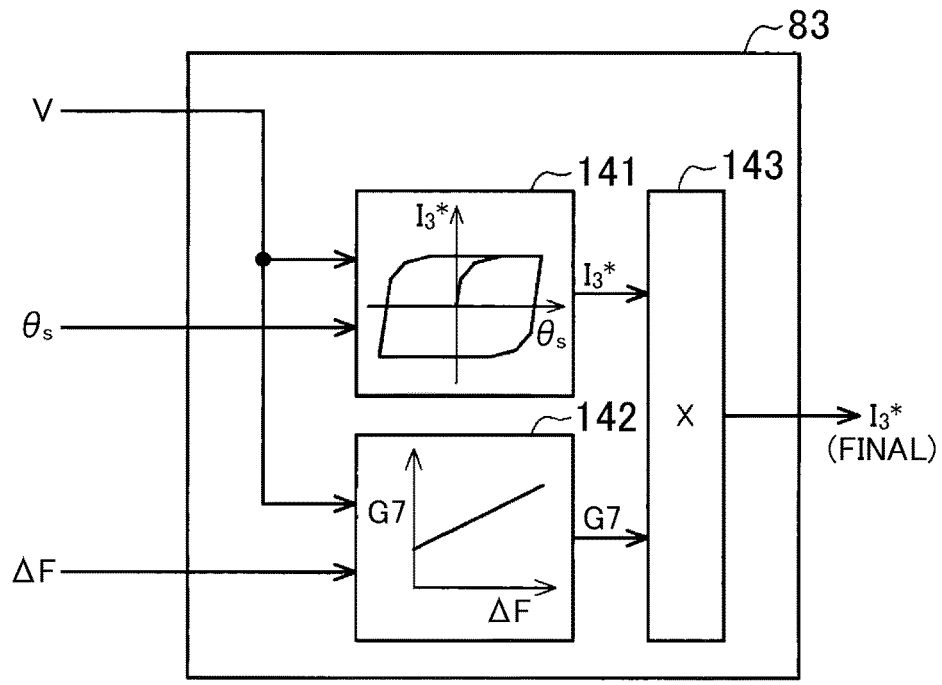
FIG. 11 is a control block diagram of a hysteresis control circuit according to a third embodiment.

As illustrated in FIG. 11, the hysteresis control circuit 83 includes a control amount calculation circuit 141, a gain calculation circuit 142, and a multiplier 143.

The control amount calculation circuit 141 calculates the hysteresis control amount $I_3^*$ by using a map that defines a relationship between the steering angle $\theta_s$ and the hysteresis control amount $I_3^*$. The hysteresis control amount $I_3^*$ has a hysteresis characteristic for the steering angle $\theta_s$. The hysteresis characteristic in the map is set from the viewpoint of optimizing a hysteresis characteristic caused by friction in a mechanical transmission system of the steering system 10. The control amount calculation circuit 141 may calculate the hysteresis control amount $I_3^*$ in consideration of the vehicle speed V.

The gain calculation circuit 142 calculates a gain G7 by using a map that defines a relationship between the axial force deviation ΔF and the gain G7 depending on the vehicle speed V. The gain G7 is set to a larger value as the axial force deviation ΔF increases.

The multiplier 143 calculates a final hysteresis control amount $I_3^*$ by multiplying the hysteresis control amount $I_3^*$ calculated by the control amount calculation circuit 141 and the gain G7 together. The gain G7 reflects the axial force deviation ΔF, and therefore the final hysteresis control amount $I_3^*$ also reflects the axial force deviation ΔF.

According to this example, the hysteresis control amount $I_3^*$ is changed in response to the axial force deviation $\Delta F$ between the ideal axial force $F_i$ and the estimated axial force $F_e$, thereby attaining a more appropriate hysteresis control amount $I_3^*$ (final) based on the road condition. Thus, a steering feel (sense of friction in this case) based on the hysteresis control amount $I_3^*$ that reflects the road condition can be provided for the driver. The driver feels the steering reaction force applied to the steering wheel 11 as tactile feedback, and can therefore grasp the sense of friction based on the road condition more accurately.

For example, the final hysteresis control amount $I_3^*$ has a larger value as the axial force deviation $\Delta F$ increases along with a decrease in the road grip of the tire. This is because a gain G7 having a larger value is calculated as the axial force deviation $\Delta F$ increases. Therefore, the target steering reaction force $T_1^*$ decreases by an amount corresponding to the hysteresis control amount $I_3^*$ subtracted from the basic control amount $I_1^*$. That is, the steering reaction force to be applied to the steering shaft 12 decreases by an amount corresponding to the subtraction of the hysteresis control amount $I_3^*$. Thus, a steering feel (sense of friction in this case) based on the hysteresis control amount $I_3^*$ can be provided for the driver. The driver can grasp a decrease in the sense of friction as the steering feel. Furthermore, the driver can grasp, as tactile feedback, a situation in which the road grip of the tire decreases.

Figure 12:
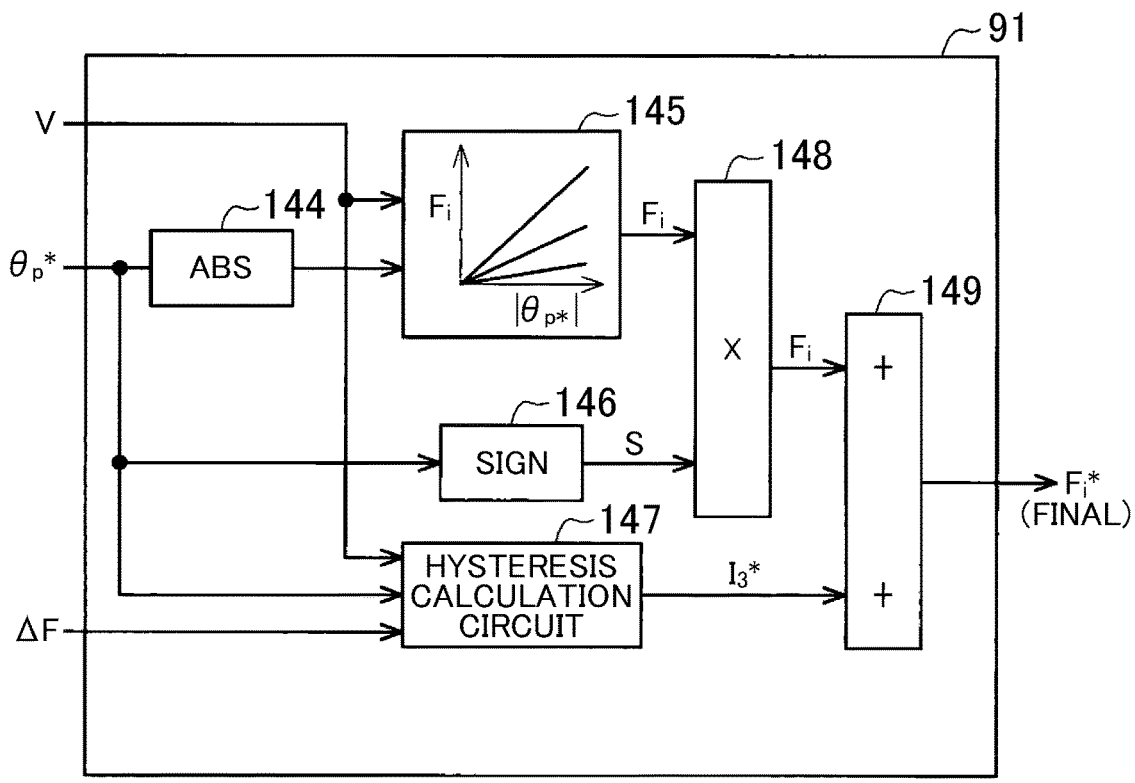
FIG. 12 is a control block diagram of an ideal axial force calculation circuit according to the third embodiment.

In this example, the ideal axial force calculation circuit 91 may have the following configuration. As illustrated in FIG. 12, the ideal axial force calculation circuit 91 includes an absolute value calculation circuit 144, an axial force calculation circuit 145, a sign calculation circuit 146, a hysteresis calculation circuit 147, a multiplier 148, and an adder 149.

The absolute value calculation circuit 144 calculates an absolute value $|\theta_p^*|$ of the target pinion angle $\theta_p^*$. The axial force calculation circuit 145 calculates the ideal axial force $F_i$ by using a map that defines a relationship between the absolute value $|\theta_p^*|$ of the target pinion angle $\theta_p^*$ and the ideal axial force $F_i$ depending on the vehicle speed V. The ideal axial force $F_i$ is set to a larger value as the absolute value $|\theta_p^*|$ of the target pinion angle $\theta_p^*$ increases.

The sign calculation circuit 146 calculates a sign S based on the target pinion angle $\theta_p^*$. Specifically, Conditions (A1) to (A3) below are applied.
(A1) When "$\theta_p^*>0$", the sign S is "1".
(A2) When "$\theta_p^*=0$", the sign S is "0".
(A3) When "$\theta_p^*<0$", the sign S is "-1".

The hysteresis calculation circuit 147 has a calculation function similar to that of the hysteresis control circuit 83 illustrated in FIG. 11. That is, the hysteresis calculation circuit 147 calculates the hysteresis control amount $I_3^*$ (final) based on the steering angle $\theta_s$, the vehicle speed V, and the axial force deviation $\Delta F$.

The multiplier 148 multiplies the ideal axial force $F_i$ calculated by the axial force calculation circuit 145 and the sign S calculated by the sign calculation circuit 146 together. The adder 149 calculates a final ideal axial force $F_i$ by adding the ideal axial force $F_i$ multiplied by the sign S and the hysteresis control amount $I_3^*$ calculated by the hysteresis calculation circuit 147 together.

By adding the hysteresis control amount $I_3^*$ based on the axial force deviation $\Delta F$ to the ideal axial three $F_i$ multiplied by the sign S, the final ideal axial three $F_i$ is even closer to the actual axial force (estimated axial force). The final axial force $F_{sp}$ calculated by the axial three blending calculation circuit 95 reflects the estimated axial force with higher superiority to the ideal axial force $F_i$.

Next, a vehicle control apparatus according to a fourth embodiment is described. Depending on product specifications or the like, there is a demand to further improve the steering wheel return performance in the tire grip limit range when the vehicle is traveling along a low-friction road or the like in this example, the target steering reaction force calculation circuit 51 has the following configuration.

Figure 13:
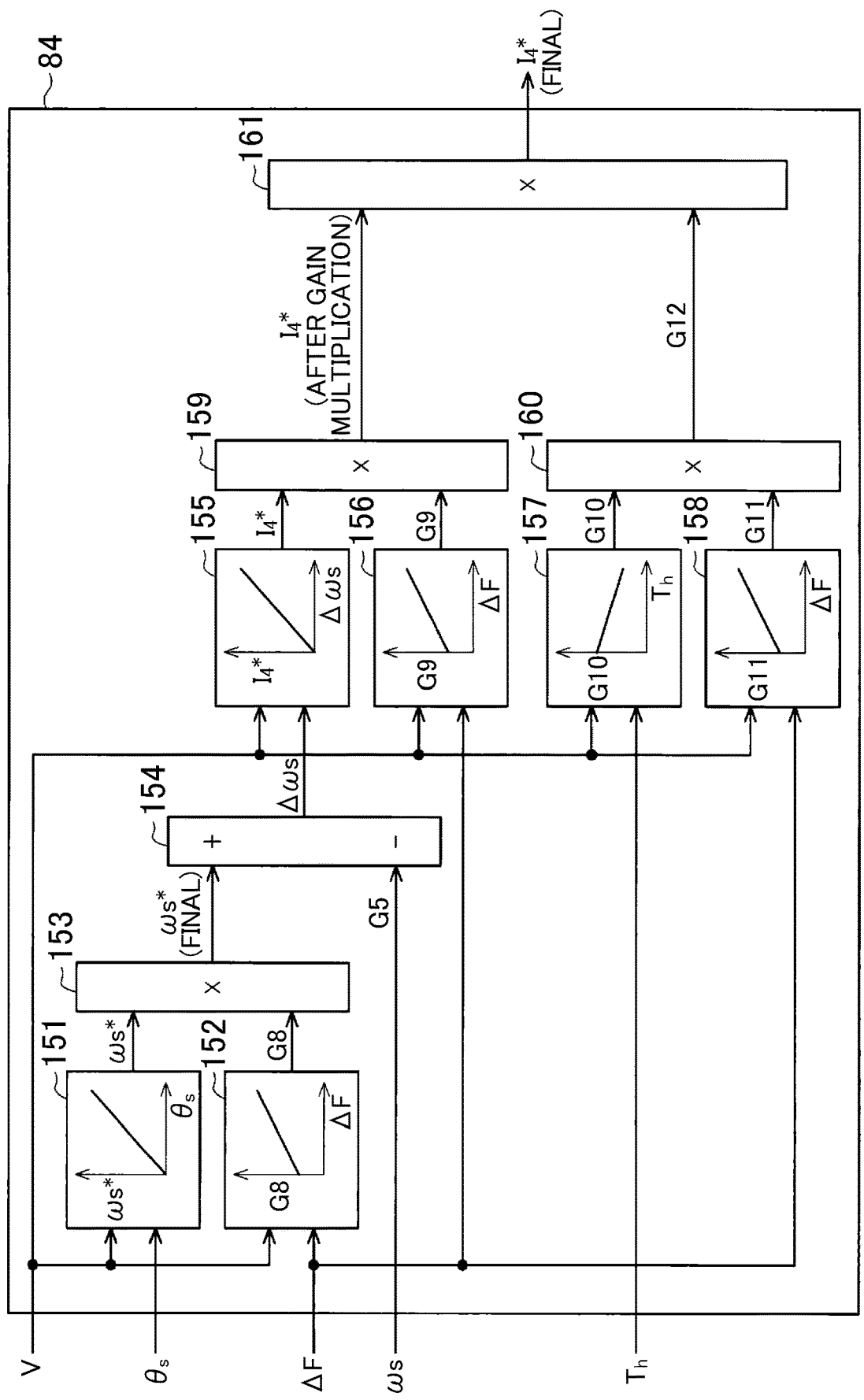
FIG. 13 is a control block diagram of a steering wheel return control circuit according to a fourth embodiment.

As illustrated in FIG. 13, the steering wheel return control circuit 84 includes a target speed calculation circuit 151, four gain calculation circuits 152, 156, 157, and 158, four multipliers 153, 159, 160, and 161, a subtractor 154, and a control amount calculation circuit 155.

The target speed calculation circuit 151 calculates a target speed $\omega_s^*$ by using a map that defines a relationship between the steering angle $\theta_s$ and the target speed $\omega_s^*$ depending on the vehicle speed V. The target speed $\omega_s^*$ is a target value of a speed when the steering wheel 11 is returned to its neutral position. The target speed $\omega_s^*$ is set to a larger value as the steering angle $\theta_s$ (absolute value) increases.

The gain calculation circuit 152 calculates a gain G8 by using a map that defines a relationship between the axial force deviation $\Delta F$ and the gain G8 depending on the vehicle speed V. The gain G8 is set to a larger value as the axial three deviation $\Delta F$ increases.

The multiplier 153 calculates a final target speed $\omega_s^*$ by multiplying the target speed $\omega_s^*$ and the gain G8 together. The gain G8 reflects the axial force deviation $\Delta F$, and therefore the final target speed to $\omega_s^*$ also reflects the axial force deviation $\Delta F$.

The subtractor 154 calculates a speed deviation $\Delta\omega_s$ by subtracting the steering speed $\omega_s$ from the final target speed $co_s^*$. The control amount calculation circuit 155 calculates the steering wheel return control amount $I_4^*$ by using a map that defines a relationship between the speed deviation $\Delta\omega_s$ and the steering wheel return control amount $I_4^*$ depending on the vehicle speed V. The steering wheel return control amount $I_4^*$ is set to a larger value as the speed deviation $\Delta\omega_s$ increases.

The gain calculation circuit 156 calculates a gain G9 by using a map that defines a relationship between the axial force deviation $\Delta F$ and the gain G9 depending on the vehicle speed V. The gain G9 is set to a larger value as the axial force deviation $\Delta F$ increases.

The gain calculation circuit 157 calculates a gain G10 by using a map that defines a relationship between the steering torque $T_h$ and the gain G10 depending on the vehicle speed V. The gain G10 is set to a smaller value as the steering torque $T_h$ increases.

The gain calculation circuit 158 calculates a gain G11 by using a map that defines a relationship between the axial force deviation $\Delta F$ and the gain G11 depending on the vehicle speed V. The gain G11 is set to a larger value as the axial force deviation $\Delta F$ increases.

The multiplier 159 multiplies the steering wheel return control amount $I_4^*$ and the gain G9 together. The gain G9 reflects the axial force deviation $\Delta F$, and therefore the steering wheel return control amount $I_4^*$ multiplied by the gain G9 has a value based on the axial force deviation $\Delta F$.

The multiplier 160 calculates a gain G12 by multiplying the gain G10 and the gain G11 together. That is, the gain G10 based on the steering torque $T_h$ is changed in response to the axial force deviation $\Delta F$.

The multiplier 161 calculates a final steering wheel return control amount $I_4^*$ by multiplying the steering wheel return control amount $I_4^*$ multiplied by the gain G9 and the gain G12 together.

According to this embodiment, the steering wheel return control amount $I_4^*$ is changed in response to the axial force deviation ΔF, thereby attaining a more appropriate steering wheel return control amount $I_4^*$ based on the road condition. For example, a steering wheel return control amount $I_4^*$ having a larger value calculated as the axial force deviation ΔF increases due to a decrease in the road grip of the tire. Thus, the steering wheel return performance in the tire grip limit range can be improved.

The fourth embodiment may be modified as follows.

The steering wheel return control circuit 84 may have a configuration provided only with the control amount calculation circuit 155, the gain calculation circuit 156, and the multiplier 159. That is, the target speed calculation circuit 151, the gain calculation circuits 152, 157, and 158, the multipliers 153, 160, and 161, and the subtractor 154 are omitted from the steering wheel return control circuit 84 illustrated in FIG. 13. The control amount calculation circuit 155 calculates the steering wheel return control amount $I_4^*$ by using a map that defines a relationship between the steering angle $θ_s$ and the steering wheel return control amount $I_4^*$ depending on the vehicle speed V. The multiplier 159 calculates the final steering wheel return control amount $I_4^*$ by multiplying the steering wheel return control amount $I_4^*$ calculated by the control amount calculation circuit 155 and the gain G9 calculated by the gain calculation circuit 156 together.

Next, a vehicle control apparatus according to a fifth embodiment is described. Depending on product specifications or the like, there is a demand to reduce a sense of viscosity in the steering system 10 in the tire grip limit range when the vehicle is traveling along a low-friction road or the like, in this example, the target steering reaction force calculation circuit 51 has the following configuration.

Figure 14:
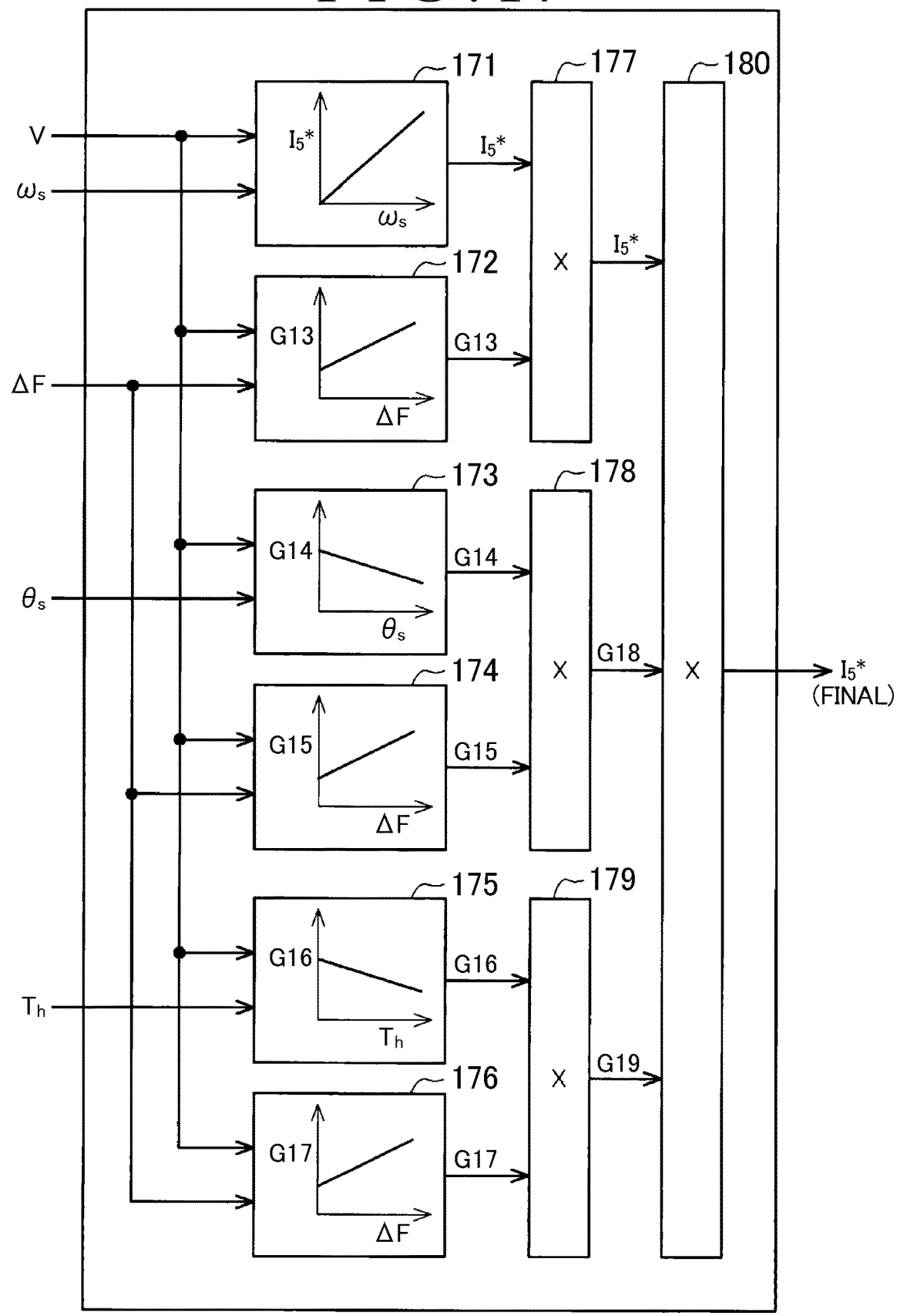
FIG. 14 is a control block diagram of a damping control circuit according to a fifth embodiment.

As illustrated in FIG. 14, the damping control circuit 85 includes a control amount calculation circuit 171, five gain calculation circuits 172, 173, 174, 175, and 176, and four multipliers 177, 178, 179 and 180.

The control amount calculation circuit 171 calculates the damping control amount $I_5^*$ by using a map that defines a relationship between the steering speed $ω_s$ and the damping control amount $I_5^*$ depending on the vehicle speed V. The damping control amount $I_5^*$ is set to a larger value as the steering speed $ω_s$ increases.

The gain calculation circuit 172 calculates a gain G13 by using a map that defines a relationship between the axial force deviation ΔF and the gain G13 depending on the vehicle speed V. The gain G13 is set to a larger value as the axial force deviation ΔF increases.

The gain calculation circuit 173 calculates a gain G14 by using a map that defines a relationship between the steering angle $θ_s$ and the gain G14 depending on the vehicle speed V. The gain G14 is set to a smaller value as the steering angle $θ_s$ (absolute value) increases.

The gain calculation circuit 174 calculates a gain G15 by using a map that defines a relationship between the axial force deviation ΔF and the gain G15 depending on the vehicle speed V. A gain G15 having a larger value is calculated as the axial force deviation ΔF increases.

The gain calculation circuit 175 calculates a gain G16 by using a map that defines a relationship between the steering torque $T_h$ and the gain G16 depending on the vehicle speed V. The gain G16 is set to a smaller value as the steering torque $T_h$ (absolute value) increases.

The gain calculation circuit 176 calculates a gain G17 by using a map that defines a relationship between the axial force deviation ΔF and the gain G17 depending on the vehicle speed V. The gain G17 is set to a larger value as the axial force deviation ΔF increases.

The multiplier 177 multiplies the damping control amount $I_5^*$ calculated by the control amount calculation circuit 171 and the gain G13 calculated by the gain calculation circuit 172 together. The multiplier 178 calculates a gain G18 by multiplying the gain G14 and the gain G15 together. The multiplier 179 calculates a gain G19 by multiplying the gain G16 and the gain G17 together. The multiplier 180 calculates a final damping control amount $I_5^*$ by multiplying the damping control amount $I_5^*$ multiplied by the gain G13, the gain G18, and the gain G19 together.

According to this embodiment, the damping control amount $I_5^*$ is changed in response to the axial force deviation ΔF between the ideal axial force $F_i$ and the estimated axial force $F_e$, thereby attaining a more appropriate damping control amount $I_5^*$ (final) based on the road condition. Thus, a more appropriate steering reaction force in response to the road condition is applied to the steering wheel 11. The driver feels the steering reaction force applied to the steering wheel 11 as tactile feedback, and can therefore grasp the road condition more accurately.

For example, the final damping control amount $I_5^*$ has a larger value as the axial force deviation ΔF increases along with a decrease in the road grip of the tire. This is because a gain G13 having a larger value is calculated as the axial force deviation ΔF increases. Therefore, the target steering reaction force $T_1^*$ decreases by an amount corresponding to the increase in the damping control amount $I_5^*$ subtracted from the basic control amount $I_1^*$. That is, the steering reaction force to be applied to the steering shaft 12 decreases by an amount corresponding to the increase in the damping control amount $I_5^*$. Thus, a steering feel (sense of viscosity in this case) based on the damping control amount $I_5^*$ can be provided for the driver. The driver can grasp a decrease in the sense of viscosity as the steering feel. Furthermore, the driver can grasp, as tactile feedback, a situation in which the road grip of the tire decreases.

The damping control amount $I_5^*$ is adjusted by being multiplied by the gain G14 based on the steering angle $θ_s$ and the gain G16 based on the steering torque $T_h$. The gains G14 and G16 are also changed in response to the axial force deviation ΔF. Thus, a more appropriate damping control amount $I_5^*$ based on the road condition can be attained.

Next, description is given of a vehicle control apparatus according to a sixth embodiment, which is applied to an electric power steering system (hereinafter abbreviated as "EPS"). Members similar to those of the first embodiment are represented by the same reference symbols to omit their detailed description.

Figure 15:
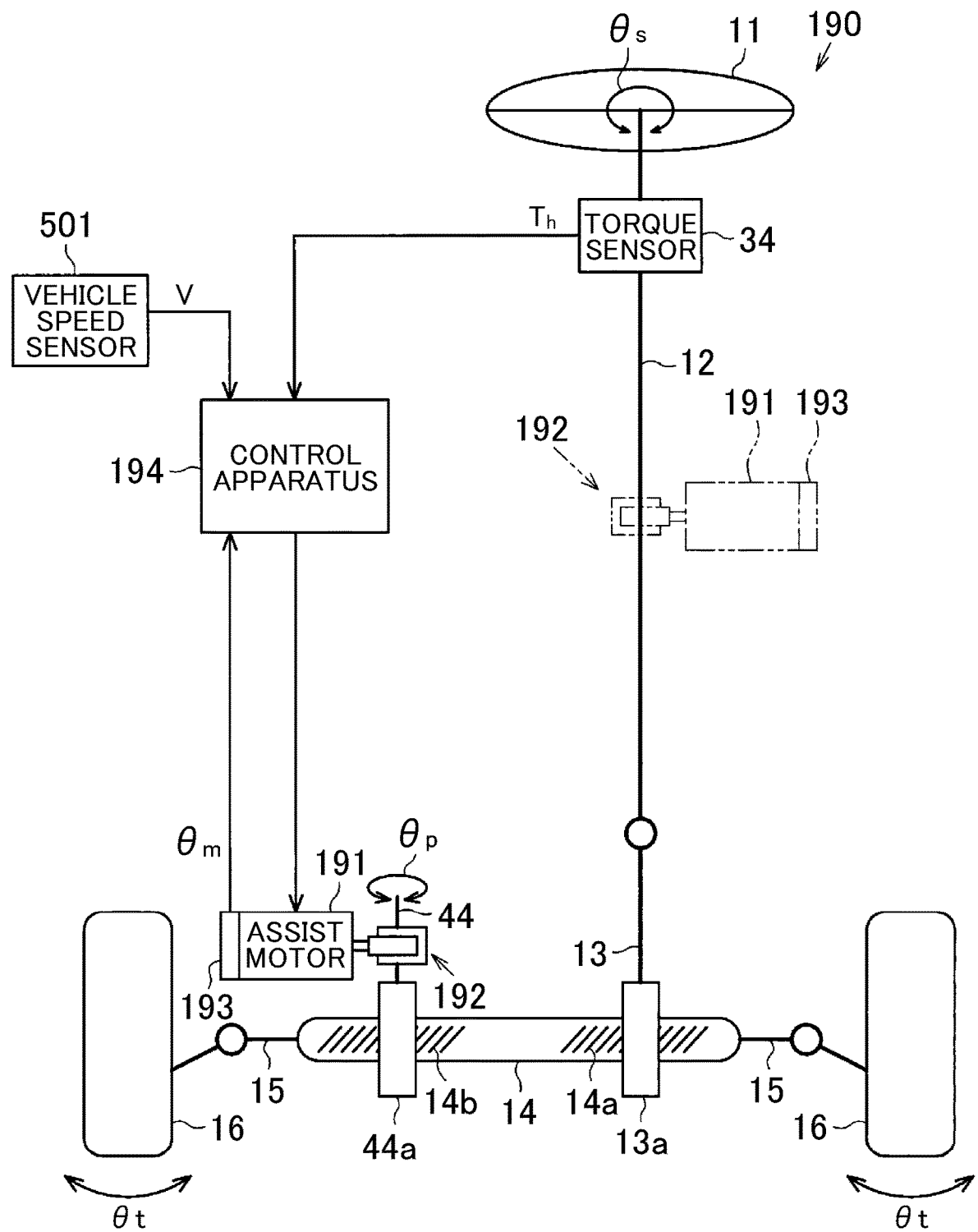
FIG. 15 is a configuration diagram of a steering system (electric power steering system) according to a sixth embodiment.

As illustrated in FIG. 15, an EPS 190 includes the steering shaft 12, the pinion shaft 13, and the steering operation shaft 14 that function as the power transmission path between the steering wheel 11 and each of the steered wheels 16 and 16. Reciprocating linear motion of the steering operation shaft 14 is transmitted to the right and left steered wheels 16 and 16 via the tie rods 15 coupled to both ends of the steering operation shaft 14, respectively.

The EPS 190 includes an assist motor 191, a speed reducing mechanism 192, the torque sensor 34, a rotation angle sensor 193, and a control apparatus 194 as a structure for generating a steering assist force (assist force). The rotation angle sensor 193 is provided on the assist motor 191 to detect its rotation angle $θ_m$.

The assist motor 191 is a source of the steering assist force. For example, a three-phase brushless motor is employed as the assist motor 191. The assist motor 191 is coupled to the pinion shaft 13 via the speed reducing mechanism 192. The speed of rotation of the assist motor 191 is reduced by the speed reducing mechanism 192, and a rotational force obtained through the speed reduction is transmitted to the pinion shaft 13 as the steering assist force.

The control apparatus 194 executes assist control for generating a steering assist force based on the steering torque $T_h$ through energization control for the assist motor 191. The control apparatus 194 controls power supply to the assist motor 191 based on the steering torque $T_h$ detected through the torque sensor 34, the vehicle speed V detected through the vehicle speed sensor 501, and the rotation angle $\theta_m$ detected through the rotation angle sensor 193.

Figure 16:
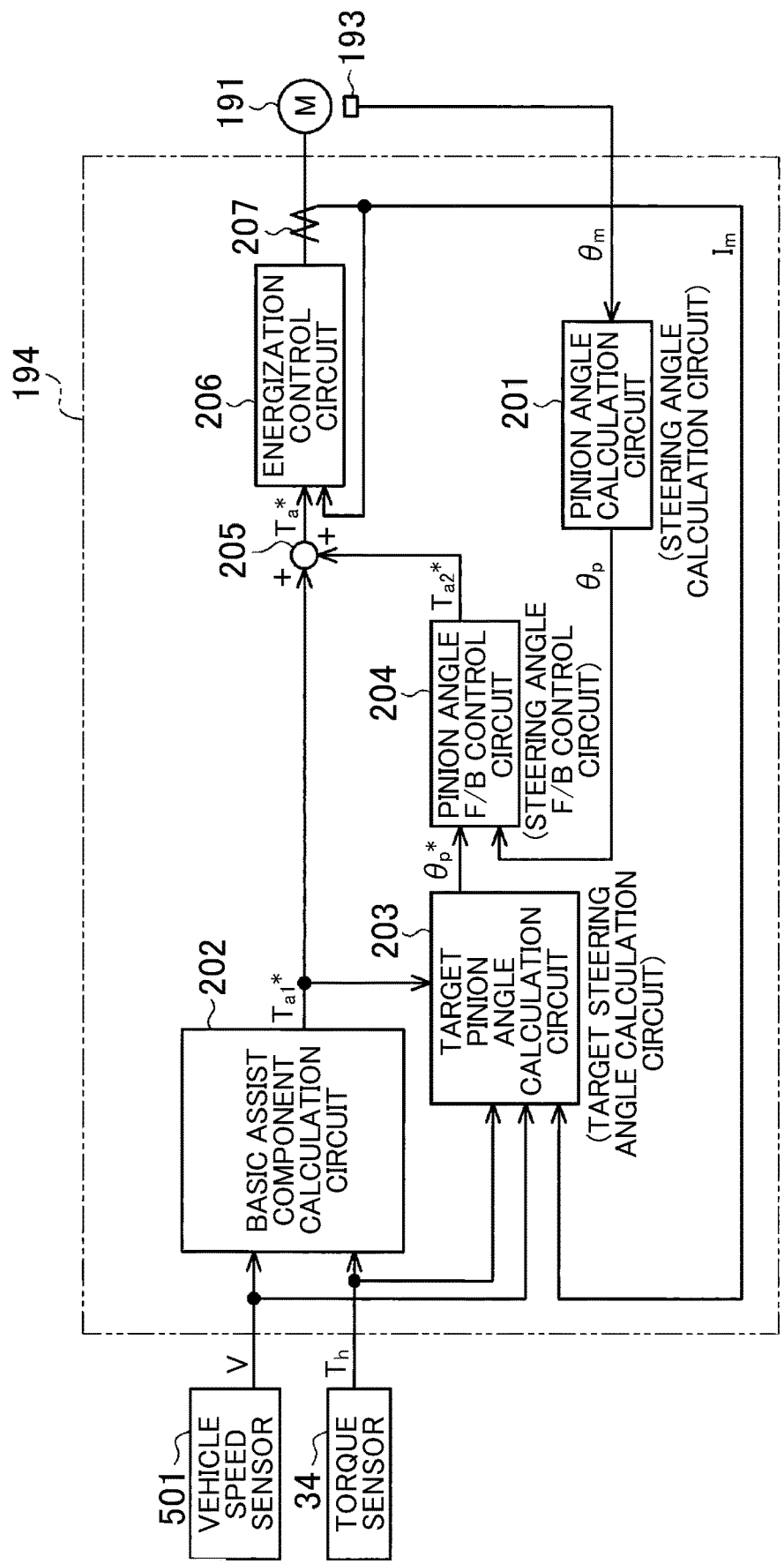
FIG. 16 is a control block diagram of an electronic control apparatus according to the sixth embodiment.

As illustrated in FIG. 16, the control apparatus 194 includes a pinion angle calculation circuit 201, a basic assist component calculation circuit 202, a target pinion angle calculation circuit 203, a pinion angle feedback control circuit (pinion angle F/B control circuit) 204, an adder 205, and an energization control circuit 206.

The pinion angle calculation circuit 201 acquires the rotation angle $\theta_m$ of the assist motor 191, and calculates a pinion angle $\theta_p$ that is the rotation angle of the pinion shaft 13 based on the acquired rotation angle $\theta_m$.

The basic assist component calculation circuit 202 basically has a configuration similar to that of the target steering reaction force calculation circuit 51 illustrated in FIG. 3. That is, the basic assist component calculation circuit 202 includes the basic control circuit 81, the system stabilization control circuit 82, the hysteresis control circuit 83, the steering wheel return control circuit 84, the damping control circuit 85, and the calculator 86. The calculator 86 calculates a basic assist component $T_{a1}^*$ (current value) by adding the stabilization control amount $I_2^*$ and the steering wheel return control amount $I_4^*$ to the basic control amount $I_1^*$ and subtracting the hysteresis control amount $I_3^*$ and the damping control amount $I_5^*$ from the basic control amount $I_1^*$.

In this example, the increase/decrease characteristic of the map that is used in the gain calculation circuit 122 (see FIG. 7) of the basic control circuit 81 is set opposite to the characteristic of the first embodiment. That is, the gain calculation circuit 122 calculates a gain G2 having a larger value as the axial force deviation ΔF increases.

The target pinion angle calculation circuit 203 acquires the basic assist component $T_{a1}^*$ calculated by the basic assist component calculation circuit 202 and the steering torque $T_h$. The target pinion angle calculation circuit 203 has an ideal model that defines an ideal pinion angle based on a basic drive torque (input torque), which is the total sum of the basic assist component $T_{a1}^*$ and the steering torque $T_h$. The ideal model is obtained by modeling a pinion angle corresponding to an ideal steered angle based on the basic drive torque through an experiment or the like in advance. The target pinion angle calculation circuit 203 determines the basic drive torque by adding the basic assist component $T_{a1}^*$ and the steering torque $T_h$ together, and calculates a target pinion angle $\theta_p^*$, from the determined basic drive torque based on the ideal model. When the target pinion angle calculation circuit 203 calculates the target pinion angle $\theta_p^*$, the vehicle speed V and a current value $I_m$ are taken into consideration. The current value $I_m$ is detected through a current sensor 207 provided in a power supply path to the assist motor 191. The current value $I_m$ is a value of an actual current supplied to the assist motor 191.

The pinion angle feedback control circuit 204 acquires the target pinion angle $\theta_p^*$ calculated by the target pinion angle calculation circuit 203 and the actual pinion angle $\theta_p$ calculated by the pinion angle calculation circuit 201. The pinion angle feedback control circuit 204 performs proportional-integral-derivative (PID) control as feedback control for the pinion angle so that the actual pinion angle $\theta_p$ follows the target pinion angle $\theta_p^*$. That is, the pinion angle feedback control circuit 204 determines a deviation between the target pinion angle $\theta_p^*$ and the actual pinion angle $\theta_p$, and calculates correction component $T_{a2}^*$ for the basic assist component $T_{a1}^*$ so as to eliminate the deviation.

The adder 205 calculates an assist command value $T_a^*$ by adding the correction component $T_{a2}^*$ to the basic assist component $T_{a1}^*$. The assist command value $T_a^*$ is a command value indicating a rotational force (assist torque) to be generated in the assist motor 191.

The energization control circuit 206 supplies electric power to the assist motor 191 based on the assist command value $T_a^*$. Specifically, the energization control circuit 206 calculates a current command value for the assist motor 191 based on the assist command value $T_a^*$. The energization control circuit 206 acquires the current value $I_m$ detected through the current sensor 207. Then, the energization control circuit 206 determines a deviation between the current command value and the actual current value $I_m$, and controls power supply to the assist motor 191 so as to eliminate the deviation. Thus, the assist motor 191 generates a torque based on the assist command value $T_a^*$. As a result, the steering is assisted based on the steering condition.

According to the EPS 190, the target pinion angle $\theta_p^*$ is set based on the ideal model from the basic drive torque (total sum of the basic assist component $T_{a1}^*$: and the steering torque $T_h$), and feedback control is performed so that the actual pinion angle $\theta_p$ equals the target pinion angle $\theta_p^*$. As described above, there is a correlation between the pinion angle $\theta_p$ and the steered angle θt of each of the steered wheels 16 and 16. Therefore, the turning operation of each of the steered wheels 16 and 16 based on the basic drive torque is also determined by the ideal model. That is, the steering feel of the vehicle is determined by the ideal model. Thus, a desired steering feel can be achieved by adjusting the ideal model.

The actual steered angle θt is kept as a steered angle θt based on the target pinion angle $\theta_p^*$. Therefore, there is attained an effect of suppressing a reverse input vibration that may be caused by a disturbance due to a road condition, braking, or the like. That is, even if a vibration is transmitted to a steering mechanism such as the steering shaft 12 via the steered wheels 16 and 16, the correction component $T_{a2}^*$ is adjusted so that the pinion angle $\theta_p$ equals the target pinion angle $\theta_p^*$. Therefore, the actual steered angle θt is kept as a steered angle $\theta_t$ based on the target pinion angle $\theta_p^*$; defined by the ideal model. Consequently, the transmission of the reverse input vibration to the steering wheel 11 is suppressed by assisting the steering in a direction in which the reverse input vibration is canceled.

The steering reaction force (tactile feedback to be acquired through a steering operation), which is a force (torque) to be applied in a direction opposite to the driver's steering direction, is only based on the target pinion angle $\theta_p^*$. That is, the steering reaction force does not change in response to a road condition such as a dry road or a low-friction road. Therefore, it is difficult for the driver to grasp the road condition as tactile feedback.

In this example, the calculation function of the target steering angle calculation circuit 52 of the first embodiment is provided to, for example, the target pinion angle calculation circuit 203.

The target pinion angle calculation circuit 203 has a functional configuration similar to that of the target steering angle calculation circuit 52 illustrated in FIG. 4. The target steering angle calculation circuit 52 acquires the target steering reaction force $T_1^*$, whereas the target pinion angle calculation circuit 203 of this example acquires the basic assist component $T_{a1}^*$. The target steering angle calculation circuit 52 acquires the current value $I_b$ of the current supplied to the steering operation motor 41, whereas the target pinion angle calculation circuit 203 of this example acquires the current value $I_m$ of the current supplied to the assist motor 191. The target pinion angle calculation circuit 203 acquires the steering torque $T_h$ and the vehicle speed V similarly to the target steering angle calculation circuit 52. The target steering angle calculation circuit 52 calculates the target steering angle $\theta^*$, whereas the target pinion angle calculation circuit 203 of this example calculates the target pinion angle $\theta_p^*$. Although a part of the signals to be acquired and the signal to be generated are different, details of internal calculation processing of the target pinion angle calculation circuit 203 are the same as those of the target steering angle calculation circuit 52.

According to this embodiment, effects similar to those of the first embodiment can be attained. That is, the basic control amount $I_1^*$ is changed in response to the axial force deviation $\Delta F$ between the ideal axial force $F_i$ and the estimated axial force $F_e$, thereby calculating a basic assist component $T_{a1}^*$ that reflects the road condition (such as a road frictional resistance) more appropriately. Thus, a more appropriate assist force in response to the road condition is applied to the steering wheel 11. The driver feels the steering reaction force via the steering wheel 11 as tactile feedback, and can therefore grasp the road condition more accurately.

For example, the gain G2 calculated by the gain calculation circuit 122 (see FIG. 7) is set to a larger value as the axial force deviation $\Delta F$ increases along with a decrease in the road grip of the tire. Therefore, the basic control amount $I_1^*$ and furthermore the basic assist component $T_{a1}^*$ have larger values. Thus, a more appropriate (greater) assist force in response to the road grip of the tire is applied to the steering wheel 11. Through a decrease in the steering torque $T_h$ along with the increase in the assist force, the driver can grasp, as tactile feedback, a situation in which the road grip of the tire decreases.

The sixth embodiment may be modified as follows. In this example, the calculation functions of the target steering reaction force calculation circuit 51 of the second to fifth embodiments may be provided to the basic assist component calculation circuit 202. Also in this case, effects similar to those of the second to fifth embodiments can be attained.

In this example, the electric power steering system (EPS) 190 configured to apply a steering assist force to the steering operation shaft 14 is taken as an example, but another type of EPS configured to apply a steering assist force to the steering shaft may be employed instead. Details are as follows.

As indicated by long dashed double-short dashed lines in FIG. 15, the assist motor 191 is coupled to the steering shaft 12 instead of the steering operation shaft 14 via the speed reducing mechanism 192. The pinion shaft 44 may be omitted. In this case, the control apparatus 194 executes feedback control for the steering angle $\theta_s$ instead of the feedback control for the pinion angle $\theta_p$.

That is, as parenthesized in FIG. 16, the pinion angle calculation circuit 201 functions as a steering angle calculation circuit configured to calculate a steering angle $\theta_s$ based on the current value $I_m$ of the assist motor 191. The target pinion angle calculation circuit 203 functions as a target steering angle calculation circuit configured to calculate a target steering angle that is a target value of the steering angle $\theta_s$ based on the steering torque $T_h$, the vehicle speed V, the basic assist component $T_{a1}^*$, and the current value $I_m$. The target steering angle calculation circuit basically has a configuration similar to that of the target steering angle calculation circuit 52 illustrated in FIG. 4. The differentiator 79 provided in the control apparatus 194 calculates a steering speed $\omega_s$ by differentiating the steering angle $\theta_s$. The pinion angle feedback control circuit 204 functions as a steering angle feedback control circuit configured to determine a deviation between the target steering angle and the actual steering angle $\theta_s$, and calculate a correction component $T_{a2}^*$ for the basic assist component $T_{a1}^*$ so as to eliminate the deviation.

The embodiments may be modified as follows. In the first to sixth embodiments, the torque sensor 34 is provided on the steering shaft 12, but may be provided on the pinion shaft 13. The position where the torque sensor 34 is provided is not limited as long as the steering torque $T_h$ can be detected.

In the first to fifth embodiments, the steer-by-wire type steering system 10 may have a configuration in which the clutch 21 is omitted. In the first to fifth embodiments, the control apparatus 50 may have a configuration in which the differentiation steering control circuit 63 is omitted. In this case, the pinion angle feedback control circuit 64 acquires the target pinion angle $\theta_p^*$ calculated by the steering angle ratio change control circuit 62, and executes feedback control for the pinion angle $\theta_p$ so that the actual pinion angle $\theta_p$ follows the acquired target pinion angle $\theta_p^*$.

In the first to fifth embodiments, the control apparatus 50 may have a configuration in which both the differentiation steering control circuit 63 and the steering angle ratio change control circuit 62 are omitted. In this case, the target steering angle $\theta^*$ calculated by the target steering angle calculation circuit 52 is directly used as the target pinion angle ($\theta_p^*$). That is, the steered wheels 16 and 16 are turned by an amount corresponding to the operation of the steering wheel 11.

In the first to sixth embodiments, the basic control circuit 81 calculates the basic control amount $I_1^*$ by multiplying the steering torque $T_h$ and the gain G1 together, but may be configured as follows. That is, the basic control circuit 81 calculates the basic control amount $I_1^*$ by using a three-dimensional map that defines a relationship between the steering torque $T_h$ and the basic control amount depending on the vehicle speed V. The basic control circuit 81 sets the absolute value of the basic control amount $I_1^*$ to a larger value as the absolute value of the steering torque $T_h$ increases and as the vehicle speed V decreases.

In the first to sixth embodiments the vehicle model 72 may have a configuration in which at least one of the two estimated axial force calculation circuits 93 and 94 is omitted. That is, the axial force $F_{pre}$ may be calculated by summing up at least the axial force F1 (estimated axial force) estimated and calculated by the estimated axial force calculation circuit 92 and the ideal axial force $F_i$ at a predetermined blending ratio. The final axial force $F_{sp}$ is calculated by summing up the axial force $F_{pre}$ and the imaginary rack end axial force $F_{end}$.

In the first to sixth embodiments, the blending ratio $D_j$ of the estimated axial force $F_e$ calculated by the first calculation circuit 95a may be determined by using at least one of the blending ratios Dcc, $D_d$, $D_e$, $D_f$, $D_g$, $D_h$, and $D_i$ calculated by the respective blending ratio calculation circuits (108 to 114). When one of the blending ratios is used alone, the one blending ratio is directly used as the blending ratio $D_j$ of the estimated axial force $F_e$.

In the first to sixth embodiments, depending on product specifications, the vehicle speed V need not be taken into consideration in the maps that are used in the gain calculation circuits 122, 133, 142, 152, 156, 158, 172, 174, and 176 configured to calculate gains based on the axial force deviation ΔF.

In the first to sixth embodiments, the gain calculation circuits 122, 133, 142, 152, 156, 158, 172, 174, and 176 calculate gains by using the axial force deviation ΔF that is a difference between the ideal axial force $F_i$ and the estimated axial force $F_e$, but a difference between one of the following axial forces (B1) to (B4) and the ideal axial force $F_i$ may be used as the axial force deviation ΔF.

(B1) The axial force F1 calculated by the estimated axial force calculation circuit 92. The axial force F1 is based on the current value $I_b$ of the steering operation motor 41.

(B2) The axial force F2 estimated and calculated by the estimated axial force calculation circuit 93. The axial force F2 is based on the lateral acceleration LA.

(B3) The axial force F3 estimated and calculated by the estimated axial force calculation circuit 94. The axial force F3 is based on the yaw rate YR.

(B4) The axial force $F_c$ calculated by the multiplier 103 of the axial force blending calculation circuit 95. The axial force $F_c$ is obtained by summing up the axial forces F2 and F3 at predetermined blending ratios.

In this case, the subtractor 107 illustrated in FIG. 6 may acquire the axial force F1, the axial force F2, the axial force F3, or the axial force $F_c$ in place of the estimated axial force $F_e$. As indicated by long dashed double-short dashed lines in FIG. 6, a subtractor 107*a* may be added to the axial force blending calculation circuit 95, and the added subtractor 107*a* may calculate a difference between the ideal axial force $F_i$ and the axial force F1, the axial force F2, the axial force F3, or the axial force $F_c$. FIG. 6 illustrates an example in which the added subtractor 107*a* acquires the axial force F1.

What is claimed is:

1. A vehicle control apparatus configured to control a motor based on a command value that is calculated based on a steering condition, the motor being a source of a driving force to be applied to a steering mechanism of a vehicle, the vehicle control apparatus comprising:
    a first calculation circuit configured to calculate a first component of the command value based on at least a steering torque;
    a second calculation circuit configured to calculate a target rotation angle of a rotating body based on a final basic drive torque based on a basic drive torque, the basic drive torque being a total sum of the steering torque and the first component, the rotating body being configured to rotate in association with a turning operation of a steered wheel;
    a third calculation circuit configured to calculate a second component of the command value through feedback control performed so that an actual rotation angle of the rotating body equals the target rotation angle; and
    an energization control circuit configured to receive the command value, and supply power to the motor based on the command value, the command value being a sum of the first component of the command value and the second component of the command value, wherein
    the second calculation circuit includes:
        a first axial force calculation circuit configured to calculate a first axial force based on the target rotation angle;
        an estimated axial force calculation circuit configured to calculate, as an estimated axial force, an axial force applied to the steered wheel based on a state variable that reflects vehicle behavior or a road condition;
        a blending calculation circuit configured to calculate a final axial force to be reflected in the final basic drive torque as a reaction force component for the final basic drive torque by summing up a value obtained by multiplying the first axial force by a blending ratio and a value obtained by multiplying the estimated axial force by a blending ratio, the blending ratios being set individually based on the state variable that reflects the vehicle behavior or the road condition or based on the steering condition; and
        a subtractor configured to calculate an axial force deviation, which is a difference between the first axial force and the estimated axial force, and
    the first calculation circuit is configured to change the first component of the command value in response to the axial force deviation.

2. The vehicle control apparatus according to claim 1, wherein
    the first calculation circuit includes:
        a basic control amount calculation circuit configured to calculate a basic control amount based on the steering condition, the basic control amount being a fundamental component of the first component of the command value;
        a compensation amount calculation circuit configured to calculate a compensation amount for the fundamental component based on the steering condition; and
        a calculator configured to calculate the first component of the command value by summing up the fundamental component and the compensation amount, and
    the first component of the command value is changed by the basic control amount calculation circuit changing the basic control amount in response to the axial force deviation or the compensation amount calculation circuit changing the compensation amount in response to the axial force deviation.

3. The vehicle control apparatus according to claim 2, wherein
    in a case that the compensation amount calculation circuit changes the compensation amount in response to the axial force deviation,
    the compensation amount calculation circuit includes a stabilization control amount calculation circuit configured to calculate, based on the steering condition, a stabilization control amount for stabilizing a system, and
    the first component of the command value is changed by the stabilization control amount calculation circuit changing the stabilization control amount in response to the axial force deviation.

4. The vehicle control apparatus according to claim 2, wherein
    in a case that the compensation amount calculation circuit changes the compensation amount in response to the axial force deviation,
    the compensation amount calculation circuit includes a hysteresis control amount calculation circuit configured to calculate, based on the steering condition, a hysteresis control amount for compensating a hysteresis characteristic caused by friction during a steering operation, and the first component of the command value is changed by the hysteresis control amount calculation circuit changing the hysteresis control amount in response to the axial force deviation.

5. The vehicle control apparatus according to claim 2, wherein in a case that the compensation amount calculation circuit changes the compensation amount in response to the axial force deviation, the compensation amount calculation circuit includes a steering wheel return control amount calculation circuit configured to calculate, based on the steering condition, a steering wheel return control amount for compensating a steering wheel return characteristic, and the first component of the command value is changed by the steering wheel return control amount calculation circuit changing the steering wheel return control amount in response to the axial force deviation.

6. The vehicle control apparatus according to claim 2, wherein in a case that the compensation amount calculation circuit changes the compensation amount in response to the axial force deviation, the compensation amount calculation circuit includes a damping control amount calculation circuit configured to calculate, based on the steering condition, a damping control amount for compensating a viscosity of the steering mechanism, and the first component of the command value is changed by the damping control amount calculation circuit changing the damping control amount in response to the axial force deviation.

7. The vehicle control apparatus according to claim 1, wherein the steering mechanism includes a steering operation shaft configured to turn the steered wheel by applying a steering operation force generated by a steering operation motor, and the estimated axial force is one of the following estimated axial forces:

a. a first estimated axial force calculated based on a current value of the steering operation motor;

b. a second estimated axial force calculated based on a lateral acceleration applied to the vehicle;

c. a third estimated axial force calculated based on a yaw rate, which is a speed at which the vehicle makes a turn;

d. a fourth estimated axial force obtained by summing up a value obtained by multiplying the second estimated axial force by a blending ratio and a value obtained by multiplying the third estimated axial force by a blending ratio, the blending ratios being set individually based on the vehicle behavior; and e. a fifth estimated axial force obtained by summing up a value obtained by multiplying the first estimated axial force by a blending ratio, a value obtained by multiplying the second estimated axial force by a blending ratio, and a value obtained by multiplying the third estimated axial force by a blending ratio, the blending ratios being set individually based on the vehicle behavior.

8. The vehicle control apparatus according to claim 1, wherein the steering mechanism includes:

a pinion shaft that serves as the rotating body and is mechanically separable from a steering wheel; and a steering operation shaft configured to turn the steered wheel in association with rotation of the pinion shaft, and the steering mechanism includes, as control targets:

a reaction motor that serves as the motor and is configured to generate, based on the command value, a steering reaction force as the driving force to be applied to the steering wheel, the steering reaction force being a torque in a direction opposite to a steering direction; and a steering operation motor configured to generate a steering operation force for turning the steered wheel, the steering operation force being applied to the pinion shaft or the steering operation shaft.

9. The vehicle control apparatus according to claim 1, wherein the steering mechanism includes:

a pinion shaft that serves as the rotating body and is configured to operate in association with a steering wheel; and a steering operation shaft configured to turn the steered wheel in association with rotation of the pinion shaft, and the motor is an assist motor configured to generate a steering assist force as the driving force to be applied to the steering wheel, the steering assist force being a torque in a direction identical to a steering direction.

\* \* \* \* \*